United States Patent
Shioji

(10) Patent No.: US 7,248,299 B2
(45) Date of Patent: Jul. 24, 2007

(54) IMAGE REPRODUCING APPARATUS

(75) Inventor: Masahiro Shioji, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 775 days.

(21) Appl. No.: 09/873,413

(22) Filed: Jun. 5, 2001

(65) Prior Publication Data

US 2002/0018656 A1 Feb. 14, 2002

(30) Foreign Application Priority Data

Jun. 6, 2000 (JP) .............................. 2000-168841

(51) Int. Cl.
- H04N 5/222 (2006.01)
- H04N 5/76 (2006.01)
- G06G 5/00 (2006.01)
- G06F 17/00 (2006.01)

(52) U.S. Cl. .............................. 348/333.02; 348/231.2; 345/619; 715/700

(58) Field of Classification Search ................ 348/231, 348/333; 345/530–544
See application file for complete search history.

(56) References Cited

U.S. PATENT DOCUMENTS 5,751,287 A * 5/1998 Hahn et al. ................. 715/775
6,226,449 B1 * 5/2001 Inoue et al. ............. 348/231.5
6,496,361 B2 * 12/2002 Kim et al. ................... 348/376
2003/0052907 A1 * 3/2003 Rekimoto .................... 345/700

FOREIGN PATENT DOCUMENTS

JP 2000-354228 12/2000

OTHER PUBLICATIONS

Windows Manual, 1995-1997 by Tracy Marks, www.windweaver.com/w95man2a.htm.*

* cited by examiner

Primary Examiner—David Ometz
Assistant Examiner—Nhan Tran
(74) Attorney, Agent, or Firm—Westerman, Hattori, Daniels & Adrian, LLP.

(57) ABSTRACT

An image reproducing apparatus includes a slot which holding a magnetooptical disk. A plurality of image folders are formed in the magnetooptical disk. The folders manage a plurality of image files. When the magnetooptical disk is inserted in the slot and an information search mode is selected, folder Nos. of the folders are detected by a CPU. The detected folder Nos. are displayed on a screen by a character generator. When any folder No. displayed on the monitor is selected, the number of image files managed by the folder holding the selected folder No. is detected by the CPU. The detected number of image files is displayed on the monitor screen by the character generator.

11 Claims, 22 Drawing Sheets

F I G. 2
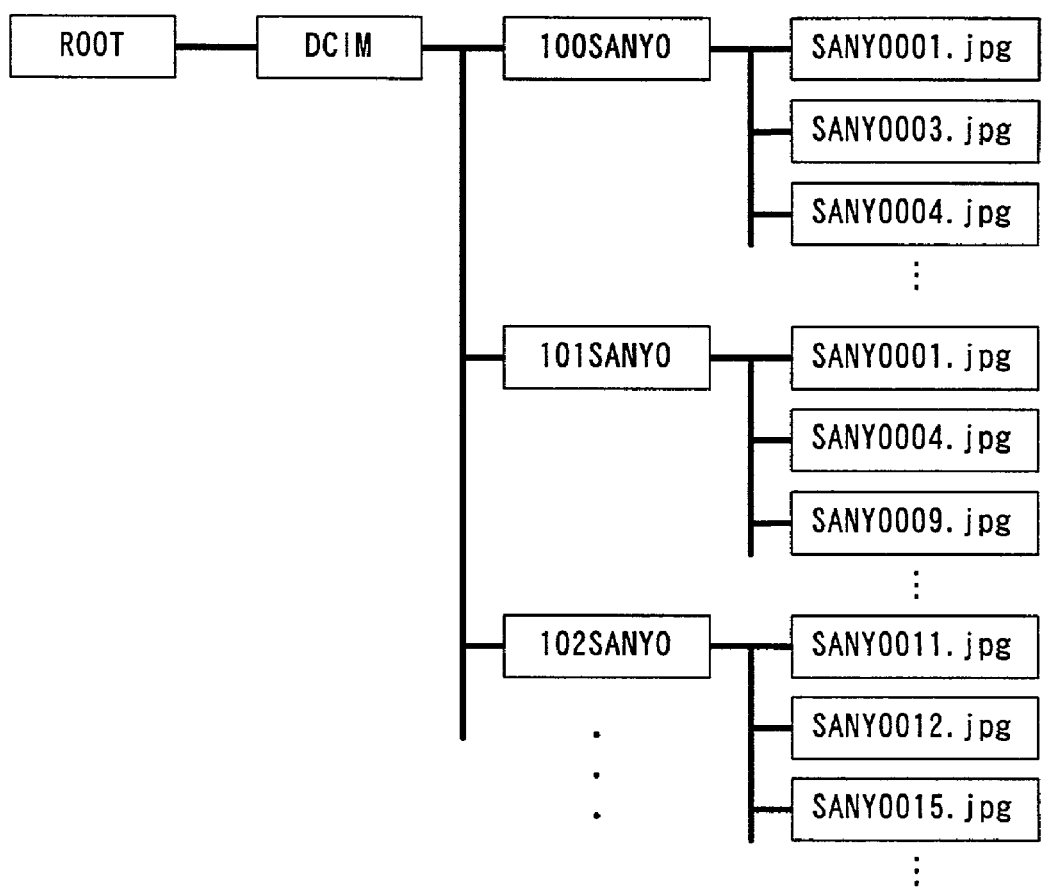

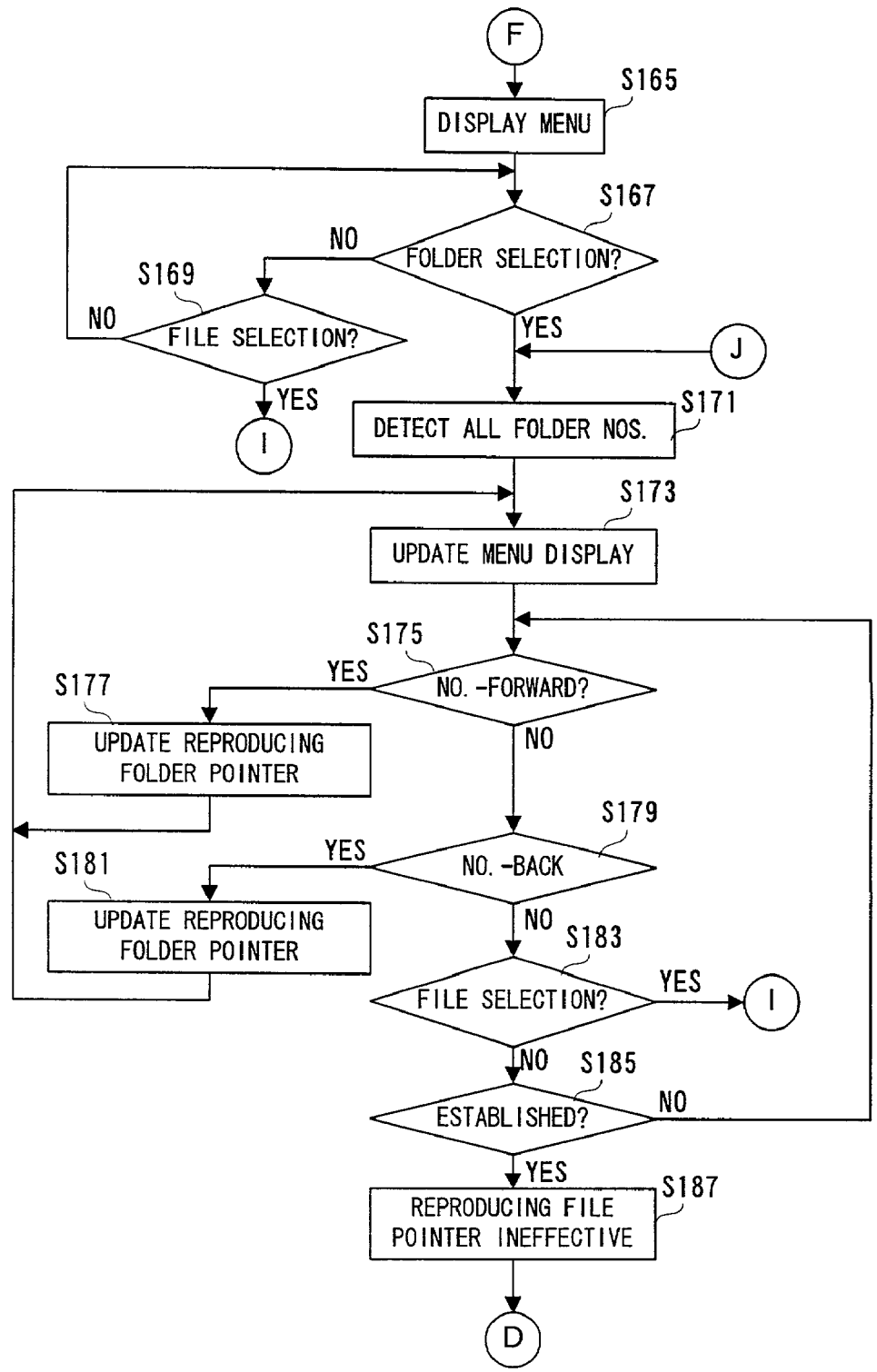
F I G. 9

FIG. 15

```
RECORD DESTINATION :
        No. 1 0 2
         N E W
        No. 1 0 0
        No. 1 0 1
      ▶ No. 1 0 2
        No. 1 0 3
        No. 1 0 4
           ▽
```

FIG. 16

```
RECORD DESTINATION :
        No. 2 1 2
         N E W
           △
        No. 2 1 0
        No. 2 1 1
      ▶ No. 2 1 2
```

FIG. 17

```
RECORD DESTINATION :
        No. 1 0 1
         N E W
        No. 1 0 0
      ▶ No. 1 0 1
        No. 1 0 2
        No. 1 0 3
        No. 1 0 4
           ▽
```

FIG. 18

```
FOLDER/FILE
  INFO.
    No. 1 0 0
    No. 1 0 1
  ▶ No. 1 0 2      ···2 8
    No. 1 0 3      SHEETS
    No. 1 0 4
    ▽
              TOTAL FILE NO.
              =1 8 7 SHEETS
```

FIG. 19

```
FOLDER/FILE
  INFO.
    No. 1 0 0
    No. 1 0 1
    No. 1 0 2
  ▶ No. 1 0 3      ···3 6
    No. 1 0 4      SHEETS
    ▽
              TOTAL FILE NO.
              =36 SHEETS
```

FIG. 20

```
NO IMAGE FILE IN
THIS CURRENT FOLDER
```

IMAGE REPRODUCING APPARATUS

BACKGROUND OF THE INVENTION

1. Field of the Invention

This invention relates to image reproducing apparatuses and, more particularly, to an image reproducing apparatus which is applicable to a digital camera for reproducing from a recording medium any image file of a plurality of image files managed by a plurality of folders holding folder Nos. different from one another.

2. Description of the Prior Art

In digital cameras, an image file including an image signal which took a picture are recorded on a recording medium. Therefore, the greater the capacity of a recording medium, the more likely to save an image file. However, the greater the number of image files to be recorded, the more difficult it becomes to operate, thus decreasing operationality.

SUMMARY OF THE INVENTION

Therefore, it is a primary object of present invention to provide an image reproducing apparatus which is capable of managing image files regardless of the number of the image files.

An image reproducing apparatus according to the invention comprising: an attacher to be attached with a recording medium forming a plurality of folders for managing a plurality of image files; a folder No. detector for detecting folder Nos. of the folders; a folder No. displayer for displaying the folder Nos. detected by the folder No. detector; a selector for selecting any one of the folder No. displayed by the folder No. displayer; a file number detector for detecting the number of image files managed by the folder holding the folder Nos. selected by the selector; and a file number displayer for displaying the number of image files detected by the file number detector.

A plurality of image folder managing a plurality of files are formed in a recording medium. When the recording medium is received by the attacher, the folder No. detector detects folder Nos. of a plurality of folders. The detected folder Nos. are displayed by the displayer. When any one of the displayed folder Nos. is selected by the selector, the number of files managed by the folder holding the selected folder No. is detected by the file number detector. The detected folder number is displayed by the file number displayer.

In other words, a plurality of image files are managed by a plurality of folders, and the number of image file managed by the folder holding the selected folder number is displayed. Due to this, it can be easily understood how many files are stored in each folder, it makes easy to manage image files.

In one embodiment of the invention, the file number displayer displays the file number on the same screen as folder Nos.

In another embodiment of the invention, the total number of image files is detected by a total file number detector and the detected file number is displayed by a total file number displayer. It is preferable that the total file number detector displays the total file number as well as the folder Nos. on the same screen.

BRIEF DESCRIPTION OF THE DRAWINGS

FIG. 2 is an illustrative view showing a configuration of a directory formed in a magnetooptical disk;

FIG. 9 is a flowchart showing yet another part of the processing of the FIG. 1 embodiment;

FIG. 15 is an illustrative view showing one part of the processing of the FIG. 1 embodiment;

FIG. 16 is an illustrative view showing another part of the processing of the FIG. 1 embodiment;

FIG. 17 is an illustrative view showing still another part of the processing of the FIG. 1 embodiment;

FIG. 18 is an illustrative view showing yet another part of the processing of the FIG. 1 embodiment;

FIG. 19 is an illustrative view showing another part of the processing of the FIG. 1 embodiment;

FIG. 20 is an illustrative view showing still another part of the processing of the FIG. 1 embodiment;

DETAILED DESCRIPTION OF THE PREFERRED EMBODIMENTS

Figure 1:
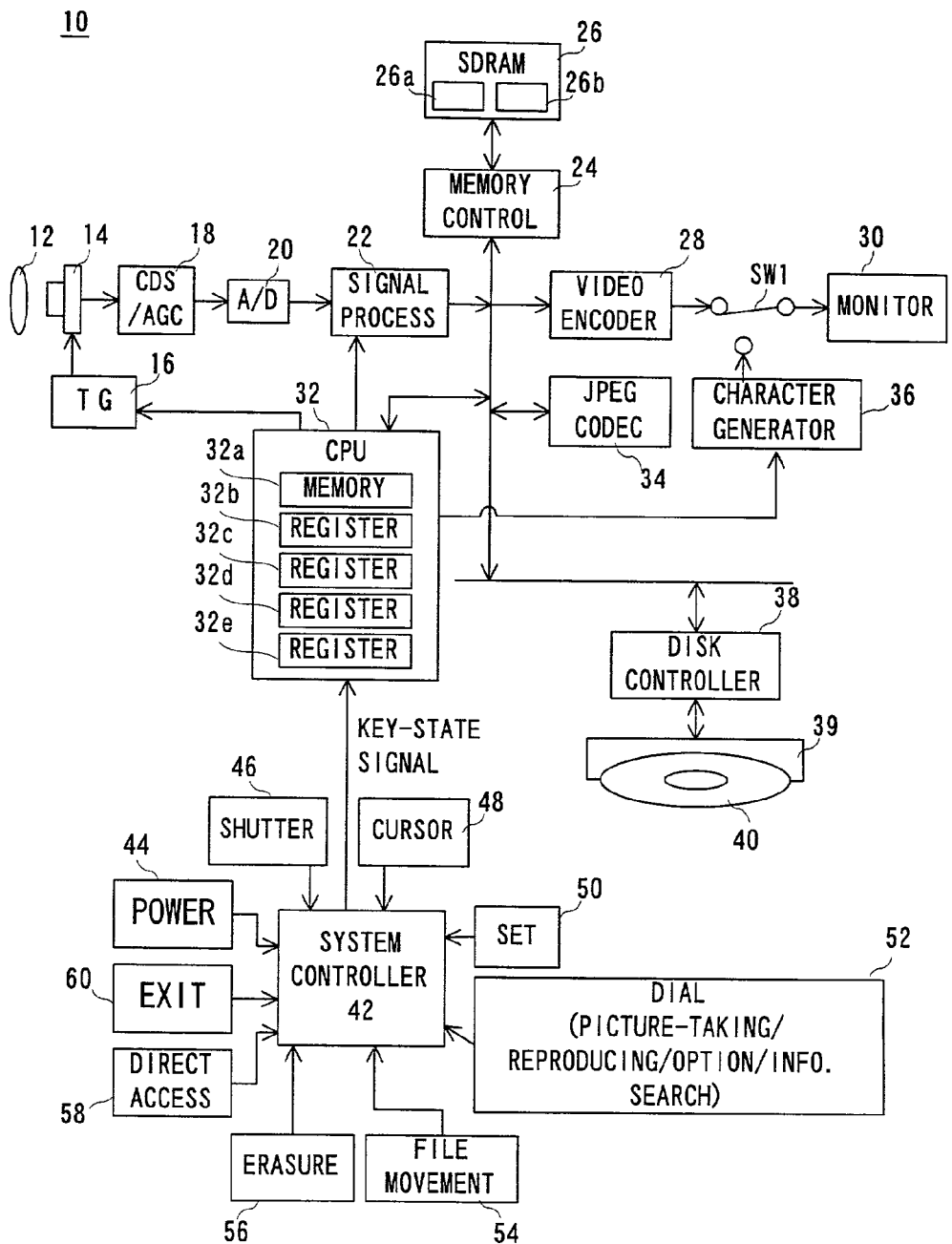
FIG. 1 is a block diagram showing an embodiment of the present invention.
Figure 3:
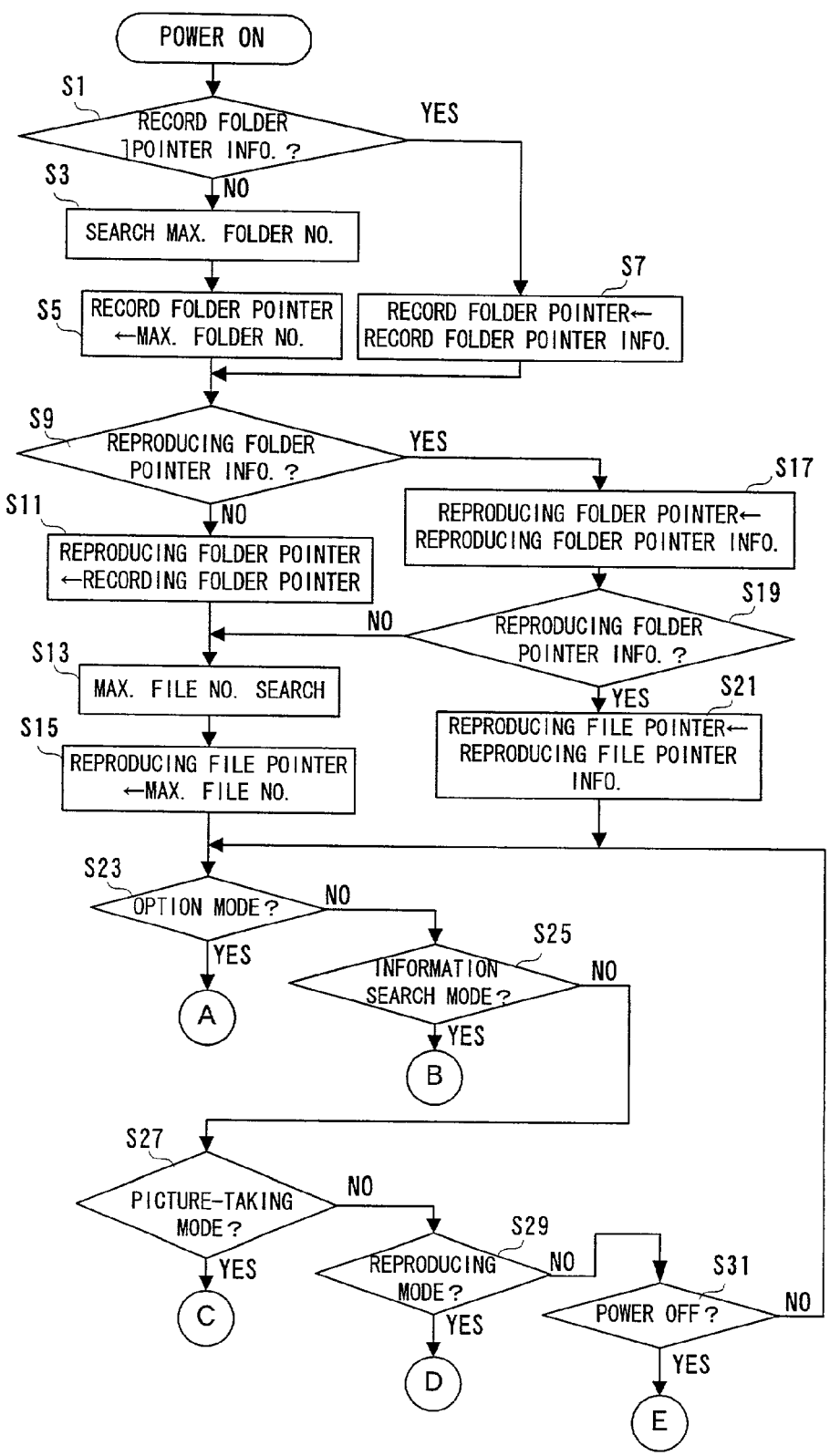
FIG. 3 is a flowchart showing one part of processing of the FIG. 1 embodiment.

Referring to FIG. 1, a digital camera 10 of this present embodiment includes a focus lens 12. An optical image of a subject is incident on a light-receiving surface of a CCD imager 14 through the focus lens 12. On the receiving surface, a camera signal (raw image signal) corresponding to the incident optical image is generated by photoelectric conversion.

A timing generator (TG) 16, upon given a process command from a CPU 32, reads a camera signal at a frame rate of 15 fps from a CCD imager14. The read camera signal is converted into a digital signal by an A/D converter 20 through a well-known noise removal and level arrangement by a CDS/AGC circuit 18.

A signal processing circuit 22, upon given a process command from the CPU 32, makes well-known signal processing such as color separation, RGB conversion, white balance arrangement and YUV conversion on a camera data outputted from an A/D converter 20, to generate image data having a luminance component (Y data) and a chrominance component (U data, V data). The generated image data is given to a memory control circuit 24 and written into an image data storage area 26a of a SDRAM 26 by the memory control circuit 24.

A video encoder 28, in response to a process command from the CPU 32, causes the memory control circuit 24 to read an image data out of the image data storage area 26a. The read image data is encoded into an NTSC-formatted composite image signal, and the encoded composite image signal is supplied to an LCD 30 through a switch SW1. As a result, an image corresponding to the composite image signal is displayed on the screen.

A character generator 36, upon given a character display command from the CPU 32, generates a desired character signal. The character signal is supplied to the LCD 30 by way of the switch SW1. Due to this, a desired character is OSD—displayed on the screen.

A JPEG CODEC 34, upon given a compression command, causes the control circuit 24 to read a one frame worth image data stored in the image data storage area 26a, and makes compression process in agreement with a JPEG format onto the read image data. On obtaining the compressed image data, the JPEG CODEC 34 gives the generated compressed image data to the memory control circuit 24. The compressed image data is stored in a compressed data storage area 26b by the memory control circuit 24. On the other hand, on receiving an decompression command, the JPEG CODEC 34 causes the memory control circuit 24 to read the compressed image data in one frame stored in the compressed data storage area 26b, and makes decompression process in agreement with the JPEG format onto the read compressed image data. On receiving the decompressed image data, the JPEG CODEC 34 stores the decompressed image data in the image data storage area 26a through the memory control circuit 24.

The CPU 32 by itself executes a process of recording/ reproducing of a compressed image data. Upon recording, the CPU 32, along with reading the compressed image data stored in the compressed data storage area 26b through the memory control circuit 24, creates header information by itself such as a file name, and then gives compressed image data, header information and recording command to a disk controller 38. The compressed image data and header information are recorded on a magnetooptical disk by the disk controller 38. Due to this, an image file is created in the magnetooptical disk 40.

On the other hand, upon reproducing, a reproducing command is given to the disk controller 38 from the CPU 32. The disk controller 38 reads a desired image file out of the magnetooptical disk 40. The compressed image data included in the read compressed image file is, similarly by the CPU 32, written into the compression data storage area 26b through the memory control circuit 24.

Note that the magnetooptical disk 40 is a removable non-volatile recording medium when connected to a slot 39 to be accessed by the disk controller 38.

The disk controller 38 manages an image file recorded on the magnetooptical disk 40 by an FAT (File Allocation Table) or UDF (Universal Disk Format) scheme. Due to this, inside the magnetooptical disk 40 a directory with hierarchical levels is formed as represented in FIG. 2. Specifically, a directory "DCIM" related to the digital camera 10 in this embodiment is formed in a lower level of a root directory "ROOT". Furthermore, a plurality of directories, "*SANYO" (* denotes a folder No.) functioning as a folder are formed parallel in a hierarchical lower level of the directory "DCIM". An image file "SANYO 0xxx.jpg" (0xxx denotes a file No., only last three digits used) is formed parallel in a lower hierarchical level of each folder.

Furthermore, as understood from FIG. 2, although the folder Nos. assigned to the folders differ, the file No. assigned to each image file may be duplicated among folders.

The system controller 42 is connected with various manipulate keys 44–60. When a key operation is made by an operator, a key-state signal showing a current key situation is given from the system controller 42 to the CPU 32. A power key 44 is a key to turn the power on/off. A shutter key 46 is a key to issue a picture-taking trigger in a subject. A cursor key 48 is a key to move the cursor over a menu when the menu is displayed. By operating this key, the cursor moves either up, down, right or left. A set key 50 is a key to select a menu item pointed by the cursor. A dial key 52 is a key to select either picture-taking mode, reproducing mode, option mode or information search mode.

A file move key 54 is a key to select a file move mode. An erase key 56 is a key to select an erase mode. A direct access 58 key is a key to select a direct access mode. These keys become effective when selecting a reproducing mode. An EXIT key 60 is a key to exit the file move mode, erase mode or direct access mode.

It is noted that an option mode is a mode to select a desired file or to prepare newly a folder. The information search mode is a mode to search for the number of image files stored in each folder. The file move mode is a mode to move an image file from one folder to another. The erase mode is a mode to erase a desired image file or folder. The direct access mode is a mode to have a direct access to a desired image file.

The CPU 32 starts processing flowchart shown in FIG. 3—FIG. 13 when given a key state signal showing an input of an electric current from the system controller 42.

Firstly, in step S1 whether or not recording folder pointer information is stored in a non-volatile memory 32a is determined. The recording folder pointer information is pointer information to point a destination of an image file record. This is concretely represented by a folder No. If such recording folder pointer information is absent, in step 3 a maximum folder No. is searched for through the disk controller 38. A maximum folder No. detected is set to a register 32b in the step 5. On the other hand, if such recording folder pointer information is present in the memory 32a, in step S7 the folder No. represented by the pointer information is set to the register 32b. Due to this, the register 32b serves as a recording folder pointer.

In the succeeding step S9, whether a reproducing folder pointer information is present in the memory 32a or not is determined. The reproducing folder pointer information is pointer information to point a folder having an image file to be reproduced. Similar to the recording folder pointer information, this is represented by a folder No. In the absence of reproducing folder pointer information, the process advances from the step S9 to step S11. to set the folder No. represented in the register 32b (recording folder pointer) to a register 32c. The register 32c serves as a reproducing folder pointer. Furthermore, a maximum folder No. is searched for through the disk controller 38 in step S13. In the succeeding step S15, the maximum file No. is set to a register 32e. The register 32e serves as a reproducing file pointer.

On the other hand, in the presence of the reproducing folder pointer information in the memory 32a, in step S17 the folder No. represented by the pointer information, is set to a register 32c (reproducing folder pointer). In addition, in step S19 whether reproducing file pointer information in the memory 32a is present or not is determined. The reproducing file pointer information is pointer information to point an image file to be reproduced. This is concretely represented by a file No. In the presence of the reproducing file pointer information, a file No. represented by the pointer information in step S21 is set to a register 32e (reproducing file pointer). In the absence of the reproducing file pointer information, the process advances to the step S13.

In this manner, the folder No. is set to both the register 32b (recording folder pointer) and the register 32c (reproducing folder pointer), and further the file No. is set to the register 32e (reproducing file pointer). Therefore, the recording folder, the reproducing folder and the reproducing file are respectively specified by the register 32b (recording folder pointer), the register 32c (reproducing folder pointer) and the register 32e (reproducing file pointer).

It is noted that, as explained later, there is among holders a holder not storing any image file. Where the reproducing folder is a folder not having any image file, in the step S13 "000" is sent back from the disk controller 38 as a maximum file No. In this case, in the step S15, "000" is set to the register 32e (reproducing file pointer).

In step S23, whether an option mode is selected or not is determined. In step S25, whether an information search mode is selected or not is determined. In step S27, whether a picture-taking mode is selected or not is determined. In step S29, whether a reproducing mode is selected or not is determined. In step S 31, whether the power is turned off or not is determined. The steps S 23–S29 are determined by a key-state signal showing a state of the dial key 52. The step S 31 is determined by a key-state signal showing a state of the electric current key 44.

Figure 4:
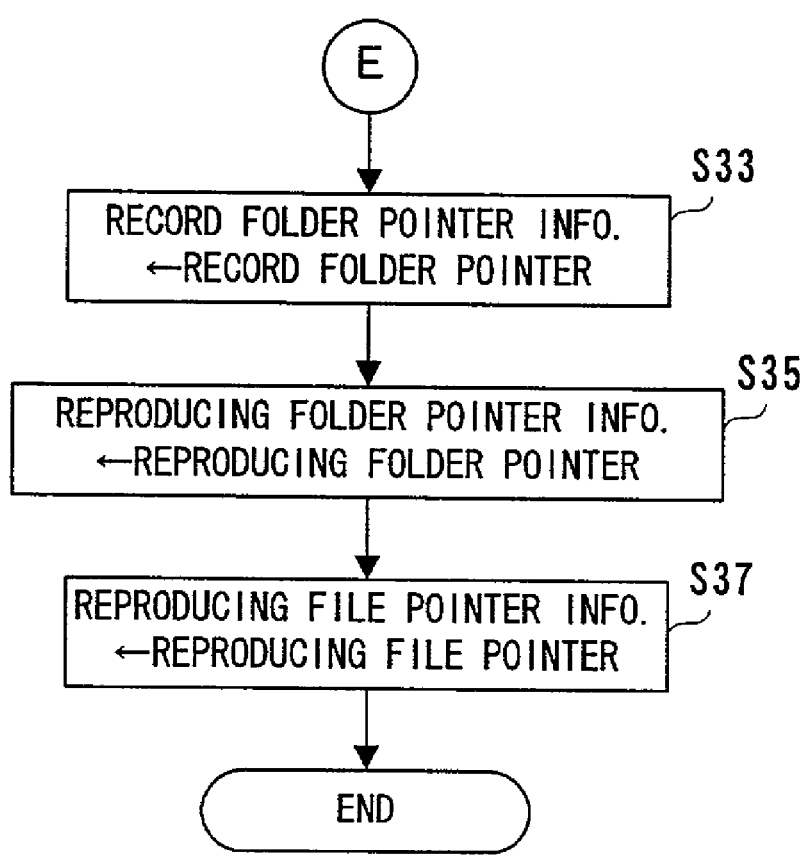
FIG. 4 is a flowchart showing another part of the processing of the FIG. 1 embodiment.

When the power is turned off, steps S33–S37 as represented in FIG. 4 are processed. Firstly, in step S33 storing a value of the register 32b (recording folder pointer) as recording folder pointer information to the memory 32a, and in step S 35 stored is a value of the register 32c (reproducing folder pointer) as reproducing folder pointer information. In step S 37, a value of the register 32e (reproducing file pointer) is stored as reproducing file pointer information to the memory 32a. Subsequently, the process is terminated.

Figure 5:
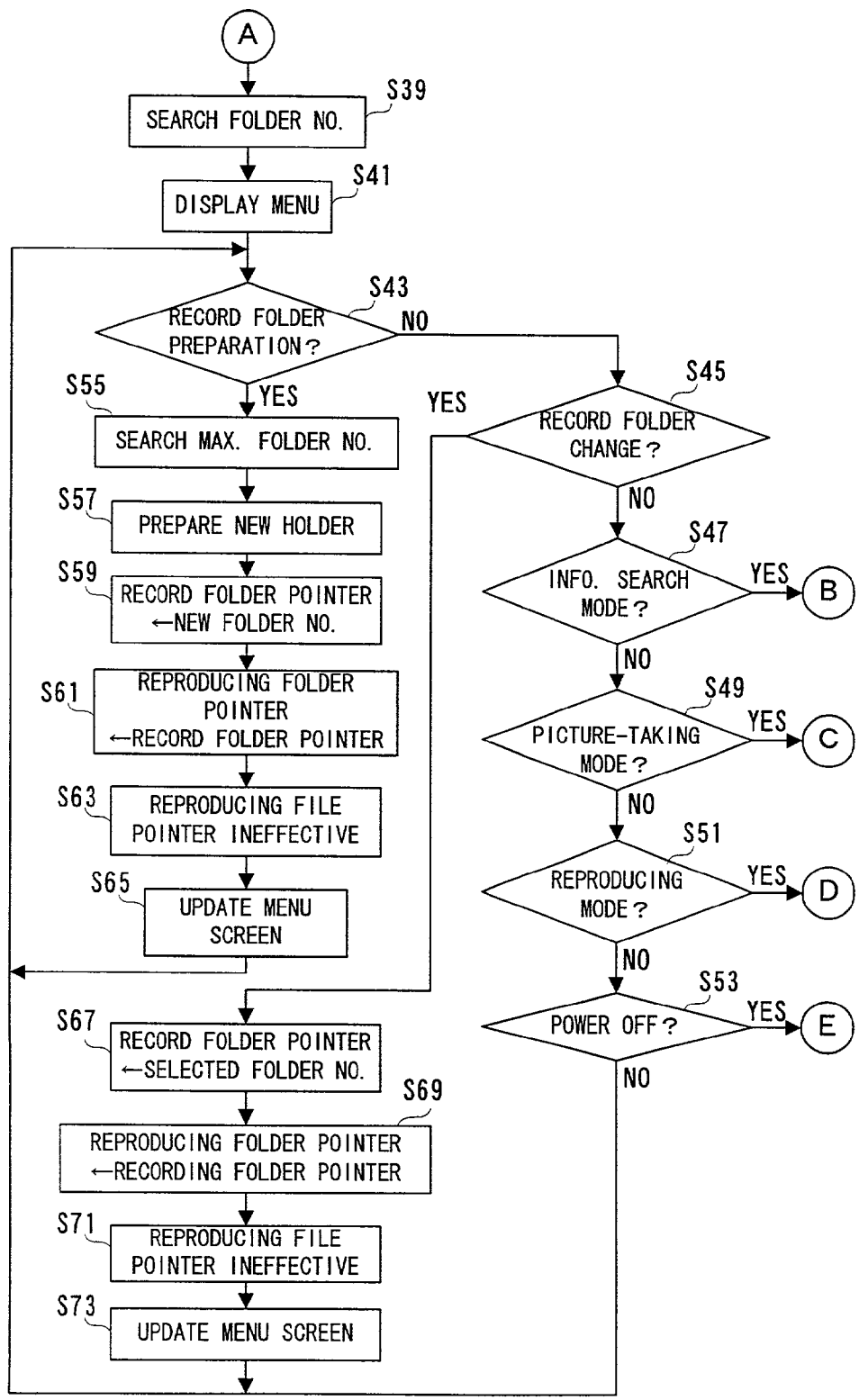
FIG. 5 is a flowchart showing still another part of the processing of the FIG. 1 embodiment.

When the option mode is selected, steps S39–S73 represented in FIG. 5 are processed. Firstly, in the step 39 detected are folder Nos. of the folders formed in the magnetooptical disk 42. In step S 41, controlling the character generator 36 and switch SW1, a menu display, for example, represented in FIG. 15 is displayed on the monitor 30. According to FIG. 15, the folder No. (recording folder No.) set by the register 32b (recording folder pointer) in the step S 5 or S 7 is displayed at the upper left of the screen. A plurality of folder Nos. detected is displayed in the step S39 in the center of the monitor. Furthermore, the cursor points at the same No. as the recording folder No. of a plurality of folder Nos. At the top of the folder Nos., a character "NEW" is displayed.

The recording folder generation mode is selected by setting the cursor to a menu "NEW" by using the cursor key 48 and pressing the set key 50. Thereupon, the CPU 32 determines YES in the step S43. In steps S55–S65 a process of forming newly a recording folder is executed. Firstly, in step S55 through disk controller 38 the maximum folder No. is searched for, and in step S57 the record holder having the number added by one to the maximum folder No. is newly created at a lower hierarchical level of the directory "DCIM" represented in FIG. 2. Next, in step S59 a folder No. of a newly created recording folder is set to the register 32b (recording folder pointer). In step S61 a value of the register 32b (recording folder pointer), namely, a newly created folder No. is set to the register 32c (reproducing folder pointer). Furthermore, while step S63 makes the register 32e (reproducing file pointer) ineffective, step S65 updates a display of the monitor 30, for example, to a menu screen represented in FIG. 16. Upon completion of the update, process returns to the step S43.

According to FIG. 16, folder Nos., "210", "211" and "212" in plurality are displayed at the center of the monitor, wherein the cursor points at "212". This "212" is displayed at the upper side of the monitor as a record destination folder No. This makes possible to know that a folder No."212" has been newly created.

A recording folder change mode, is selected by setting the cursor to another folder No. by the cursor key 48 and pressing the set key 50. In this case, the CPU 32 determines YES in the step S45 and executes step S67–step S73. In the step S67 the selected folder No. is set to the register 32b (recording folder pointer), and in the step S69 a value of the register 32b (recording folder pointer), namely, a selection folder No. is set to the register 32c (reproducing folder pointer). Subsequently, in the step S71 the register 32e (reproducing file pointer) is made ineffective, and in the step S73 a menu screen is updated.

In other words, by changing the record destination folder the value of the current register 32e (reproducing file pointer) is rendered insignificant and hence made ineffective. Meanwhile, the changed folder No.is displayed at the upper left of the menu screen. When the cursor is moved to the folder No."101" and the set key 50 is pressed, a menu screen represented in FIG. 17 is displayed on the monitor 30. Upon completion of the display switching, the process returns to S43.

When neither the recording folder generation mode nor recording folder change mode is selected, determination is made in step S47 whether the presence or absence of an information search mode selection. In step S49, determination is made as to the presence or absence of selecting a picture-taking mode. In step S51 determination is made as to the presence or absence of selecting a reproducing mode. And in step S53 determined is the presence or absence of operating the power key 44.

Figure 6:
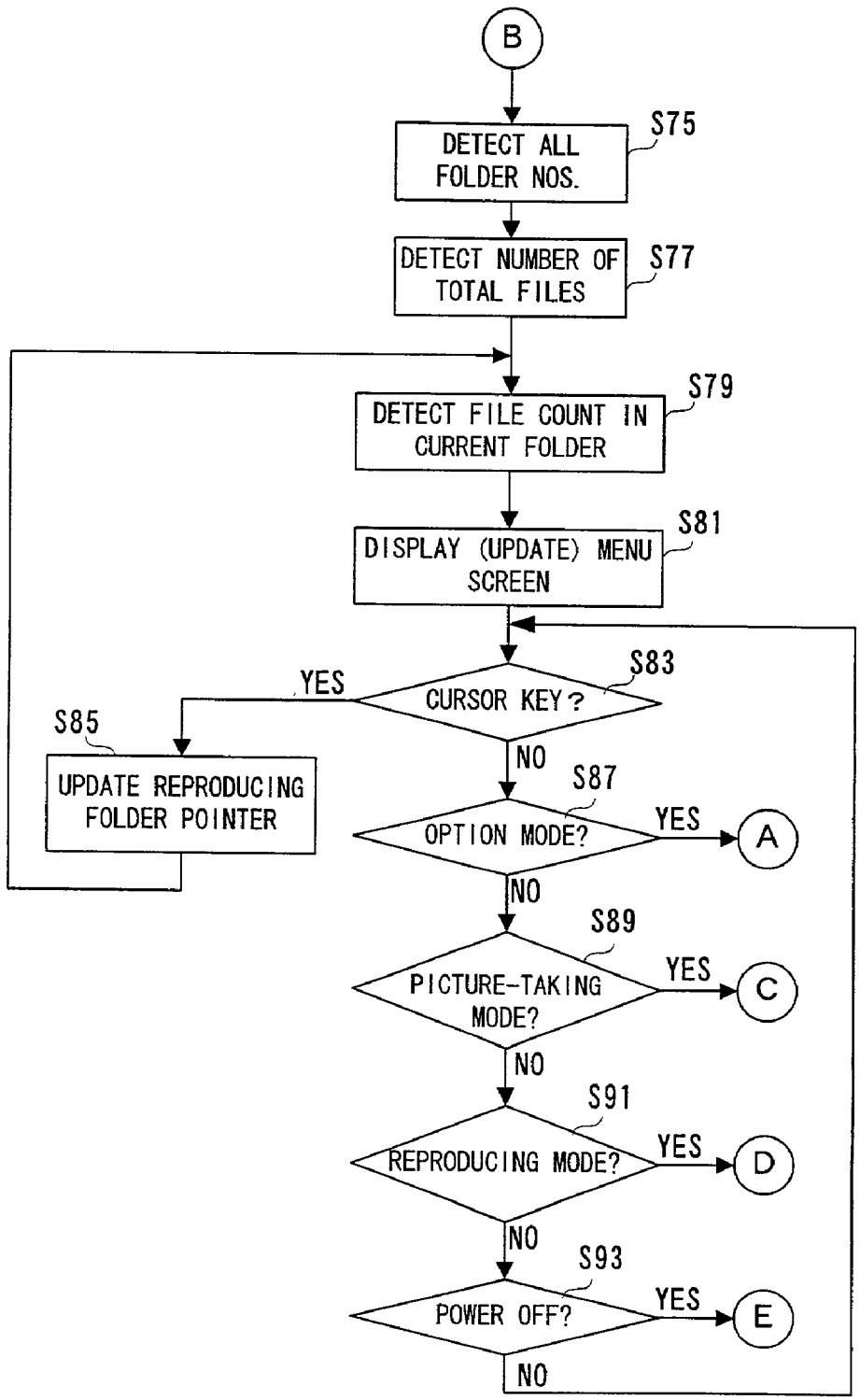
FIG. 6 is a flowchart showing yet another part of the processing of the FIG. 1 embodiment.

When the information search mode is selected, processing is made for steps S75–S93 represented in FIG. 6. Firstly, in the step S75 the number of all the folders formed in the magnetooptical disk 40 is detected. In the step S77 a total number of image files recorded in the magnetooptical disk 40 is detected, and in the step S79 detected is the number of the image file stored in the folder (current reproducing folder) pointed by the register 32*c* (reproducing folder pointer). All the processes in the step S75–S79 are executed through the disk controller 38. In the step S81, a menu screen showing a plurality of detected folder Nos., the number of files in the currently reproducing folder and a total file number of files configured are displayed on the monitor 30.

This menu screen is configured, for example as represented in FIG. 18. According to FIG. 18, a character of "FOLDER/FILE INFORMATION" is displayed at the upper left side of the screen. A plurality of folder Nos. "No. 100", "No. 101", "No. 102", "No. 103" and "No. 104" are displayed at the center of the monitor. The cursor points at the currently reproducing folder No. "No. 102". The number of files "28 SHEETS" of the image files included in the currently reproducing folder is displayed on the right side of the current reproducing folder. In addition, a total numbers of files "187 SHEETS" is displayed at the lower position of the screen.

If the operator operates the cursor key 48, the CPU 32 advances from step S83 to step S85 to update a folder No represented by the register 32*c* (reproducing folder pointer). Completing the update process, the process returns to the step S79. As a result, the number of the image files in the folder having a folder No. updated is detected in the step S79. In the succeeding step S81, the menu screen is updated. In a displaying state as shown in FIG. 18, if the operator moves the cursor downward, the display screen is updated to that of FIG. 19. According to FIG. 19, the cursor points at the folder No. "No. 103". The number of image files "36 SHEETS" included in the folder having that folder No. is displayed at the right of the screen. Note that the number of folder Nos. to be displayed at one time on the monitor is limited to five. Due to this, if the number of folders detected in the step S75 exceeds six, the following folder Nos. are displayed on the monitor by keeping pressing the cursor key 48 downward.

When the cursor key 48 is not operated, in the step S87 determination is made as to whether the option mode is selected or not. In the step S89, determination is made as to whether the picture-taking mode is selected. In the step S91 determination is made as to whether the reproducing mode is selected. And in the step S93, determined is whether the power is turned off or not.

Figure 7:
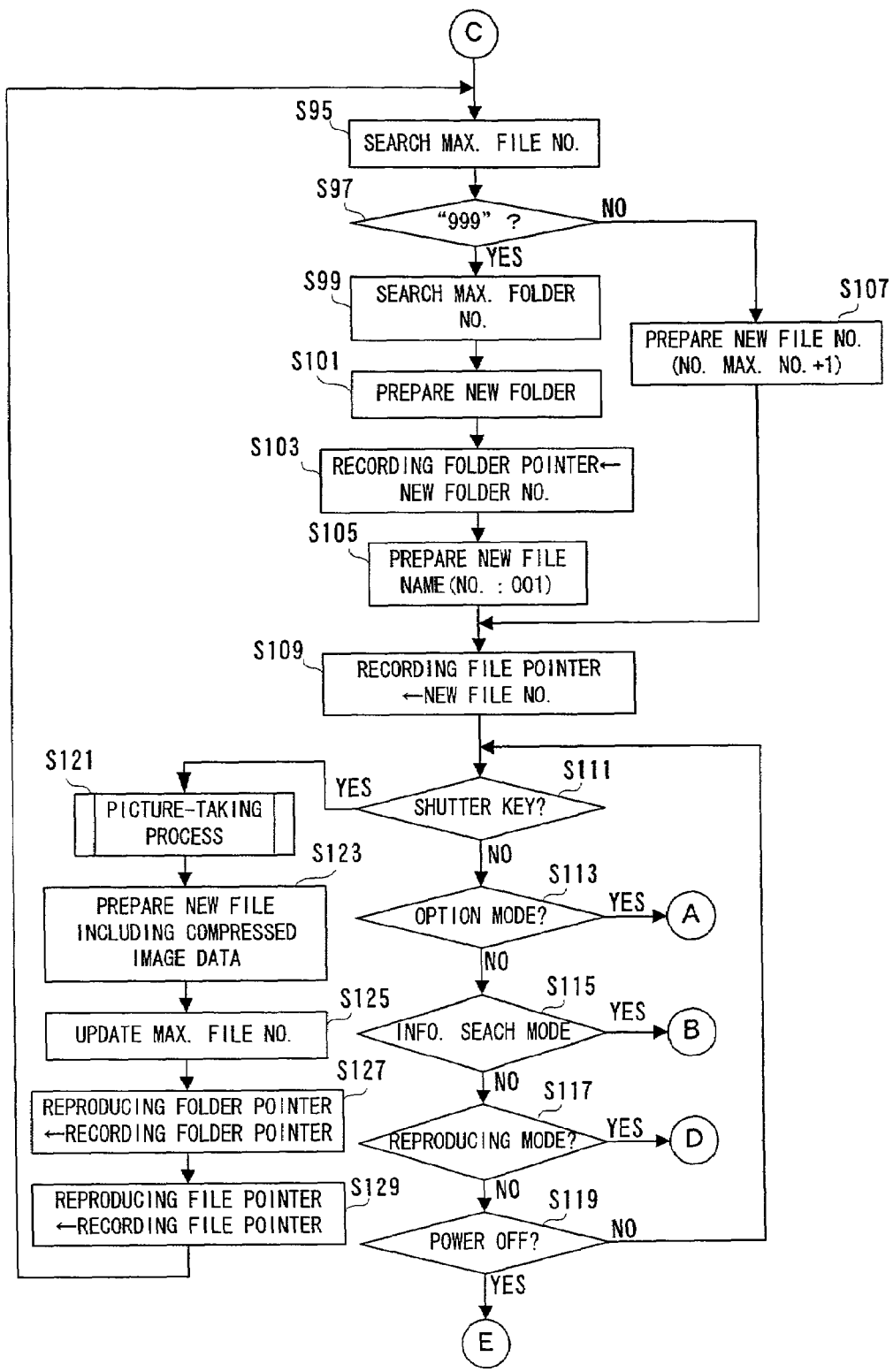
FIG. 7 is a flowchart showing another part of the processing of the FIG. 1 embodiment.

When the picture-taking mode is selected, the steps S95–S129 represented in FIG. 7 are processed. Firstly, in the step S95 the maximum file No. is searched for through the disk controller 38, and the searched maximum No is compared with a predetermined value (for example, "999") in the step S97. Namely, it is not possible in this example to assign a file No. greater than three digits. As the maximum No. to be assigned is "999", in the step S97 the maximum No is to be distinguished.

If the maximum file No. is less than "999", the process advances to the step S107, to generate an image file name assigned with No. added one to the maximum file No. Upon generating the image file name, the process advances to the step S109, to set the newly formed file No. to the register 32*d* (record file pointer). When the maximum file No. is, for example, "251", in the step S107 the image file name assigned with "252" is set to the register 32*d* (recording file pointer). In the step S109 "252" is set to the register 32*d* (recording file pointer). If no image file is stored in the current recording folder and the maximum file No. searched is "000", in the step S107 the image file name assigned to "001" is generated. In the step S109 "001" is set to the register 32*d* (recording file pointer).

On the other hand, if the maximum file No. sent back from the disk controller 38 is "999", in the step S99 the maximum folder No. is searched, and in the step S101 a new folder is generated at a lower hierarchical level of the directory "DCIM" represented in FIG. 2. In this case, the No. added by one to the maximum folder No. searched is assigned to the newly prepared folder. Next, in the step S103 the new folder No. is set to the register 32*b* (recording folder pointer), and in the step S105 a new file name having a file No. "001" is prepared.

In the step S111 it is determined whether the shutter 46 is pressed or not. If YES, in the step S121 a picture-taking process is carried out. This picture-taking process allows the compressed image data to be secured in the SDRAM 26 compressed data storage area. In the step S123 the compressed image data is read out through the memory control circuit 24, and an image file having the read compressed image data and uniquely prepared header information are recorded in the magnetooptical disk 40. In this case, the image file has a file name prepared in the step S105 or S107, and is stored at a lower hierarchical level of the folder assigned with the folder No. represented by the register 32*b* (recording folder pointer).

Subsequently, in the step S125 the maximum file No. is updated. In the step S127 the folder No represented by the register 32*b* (recording folder pointer) is set to the register 32*c* (reproducing folder pointer). In the step S129 the file No. represented by a register 32*d* (record file pointer) is set to the register 32*e* (reproducing file pointer), and then the process returns to the step S95.

It is noted that if the shutter 36 is not pressed, in the step S113 determination is made as to whether the option mode is selected or not. In the step S115 determination is made as to whether the information search mode is selected or not. In the step S117 determination is made as to whether the reproducing mode is selected or not, and in the step S119 determined is whether the power is turned off or not.

When the reproducing mode is selected, the flowchart shown in FIG. 8–FIG. 14 is processed. Firstly, in step S131 it is determined whether the register 32*e* (reproducing file pointer) is ineffective or not. If effective, the process advances to step S133. However, if ineffective, then in the step S133 the maximum file No is searched for, and in step S135 the maximum file No. searched is set to the register 32*e* (reproducing file pointer), and then the process advances to step S137.

In the step S137, it is determined whether the file No. represented by the register 32*e* is "000" or not. If No, in step S139 a reproducing process of the image file is carried out. This concretely specifies a folder having a folder No. represented by the register 32*c* (reproducing folder pointer) and reproduces an image file having a file No. represented by the register 32*e* (reproducing file pointer) among the specified files. As a result, the corresponding image is reproduced on the monitor 30.

Contrary to that, if YES in the step S137, the character generator 36 and the switch SW1 are controlled in step S141. A message "NO IMAGE FILE IN THIS CURRENT FOLDER" represented in FIG. 20 is OSD-displayed on the monitor 30.

In step S143 it is determined whether an image forward is instructed by the cursor 48 or not. If YES, a reproducing file pointer is updated in step S145. In other words, this searches for the file No. in close vicinity to and greater than the file No. represented by the register 32e (reproducing file pointer) from the same folder and to update the register 32e (reproducing file pointer) by the searched file No. Completing the update, the process returns to the step S137. As a result, the image file having the updated file No. is reproduced.

When an image back is instructed by the cursor key 48, the process advances from step S147 to step S149. This is to search for the file No. in close vicinity to and smaller than the current file No. (register 32e) in the same folder and updates the register 32e (reproducing file pointer) by the searched file No. Completing the update, the process returns to the step S137. As a result, the image file having the updated file No. is reproduced When neither the image forward nor the image back is instructed, it is determined whether or not a direct access key 58, an erase key and a file transfer key 54 are operated in step S151, step S153 and step S155 respectively. When the direct access key 58 is pressed, the process advances to FIG. 9 in order to execute a direct access mode. When the erase key 56 is pressed, the process advances to FIG. 11 in order to carry out an erase mode. When the file move 54 is pressed the process advances to FIG. 14 in order to carry out a file transfer mode.

It is noted that when neither the direct access key 58 nor the erase key 56 nor the file transfer key 54 is pressed, in step S157 determination is made as to whether or not the option mode is selected, in step S159 determination is made as to whether or not the information search mode is selected, in step S161 determination is made as to whether or not the picture-taking mode is selected, and in step S163 determined is whether or not the power is turned off.

When the direct access mode is selected, a menu display represented in step S165 of FIG. 9 is OSD-displayed on the monitor 30. According to FIG. 21, a character showing "FOLDER" and that showing "FILE" are displayed in the upper, slightly to the left of the display. The cursor points at the "FOLDER". If the operator points the cursor at the "FOLDER" and operates the set key 50, the CPU 32 determines YES in step S167 and the process advances to the step S171.

In the step S171 the folder Nos. of all the folders formed in the magnetooptical disk 40 is detected through the disk controller 38. In the succeeding step S173 the display of the monitor 30 is updated to the menu display represented in FIG. 22. According to FIG. 22, in addition to the character of "FOLDER" and "FILE", a plurality of folder Nos. detected in the step S171 is displayed. The cursor points at the folder No. represented by the register 32c (reproducing folder pointer). This makes it possible to know that the number of the currently reproducing folder is "102".

Figure 23:
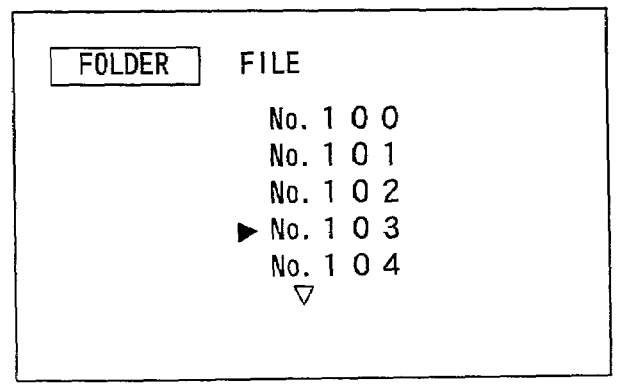
FIG. 23 is an illustrative view showing still another part of the processing of the FIG. 1 embodiment.

When a number-forward is instructed by the operator by using the cursor key 48 and the set key 50, the CPU 32 determines YES in step S175 and sets the folder No. in close vicinity to and greater than that of the currently reproducing folder to the register 32c (reproducing folder pointer) in step S177. Upon completing the setting, the process returns to the step S173, and the menu display is updated as shown in FIG. 23. On the other hand, when a number-back is instructed by the operator by the cursor key 48 and the set key 50, the CPU 32 advances from step S179 to step S181 and sets the folder No. in close vicinity to and smaller than that of the currently reproducing folder to the register 32c (reproducing folder pointer). Upon completing the setting, the process returns to the step S173. As a result the menu display is updated.

In other words, if the folder forward or the back is instructed, only the register 32c (reproducing folder pointer) is caused to change and the register 32b (recording folder pointer) keeps on showing the same folder No.

Figure 8:
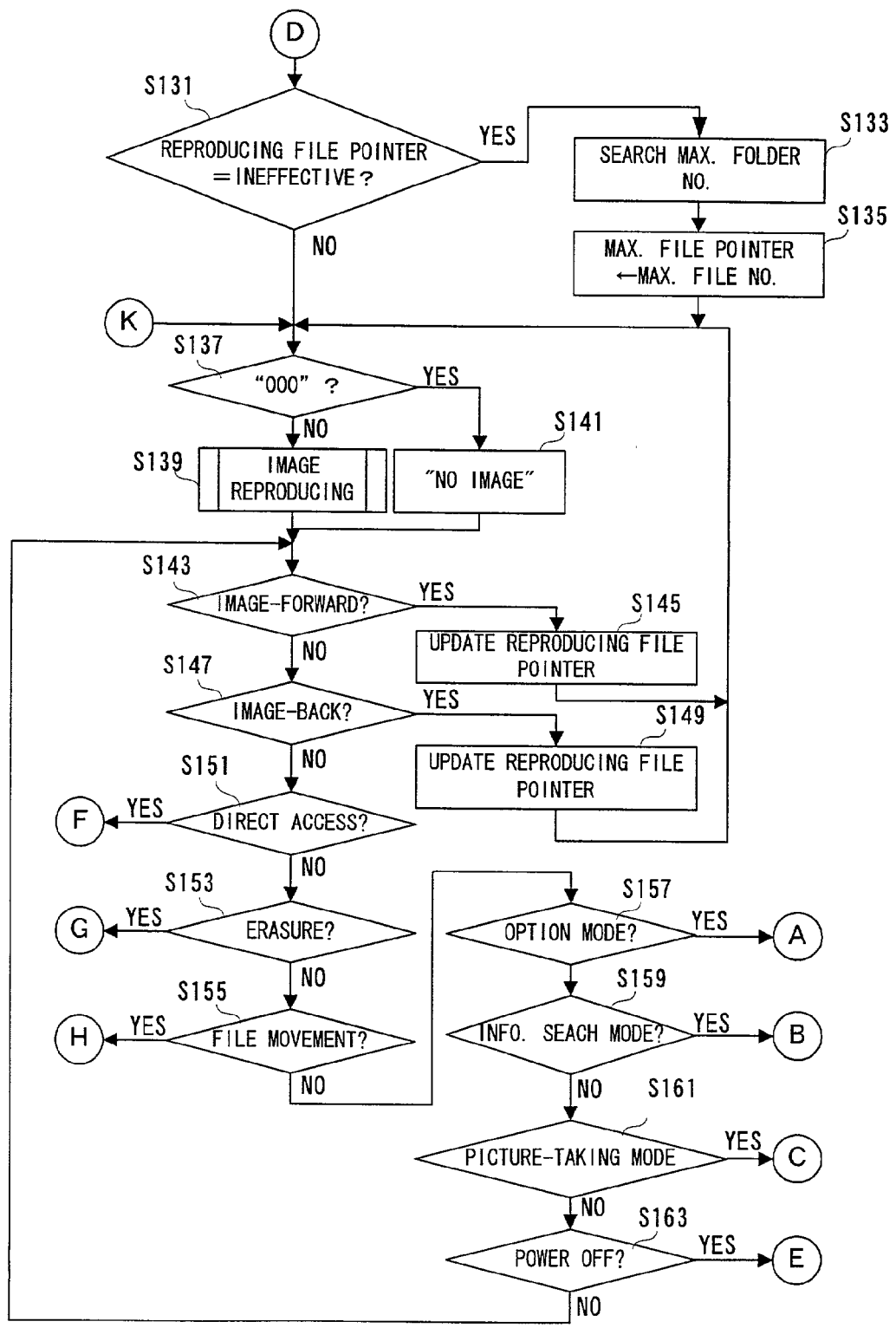
FIG. 8 is a flowchart showing still another part of the processing of the FIG. 1 embodiment.
Figure 10:
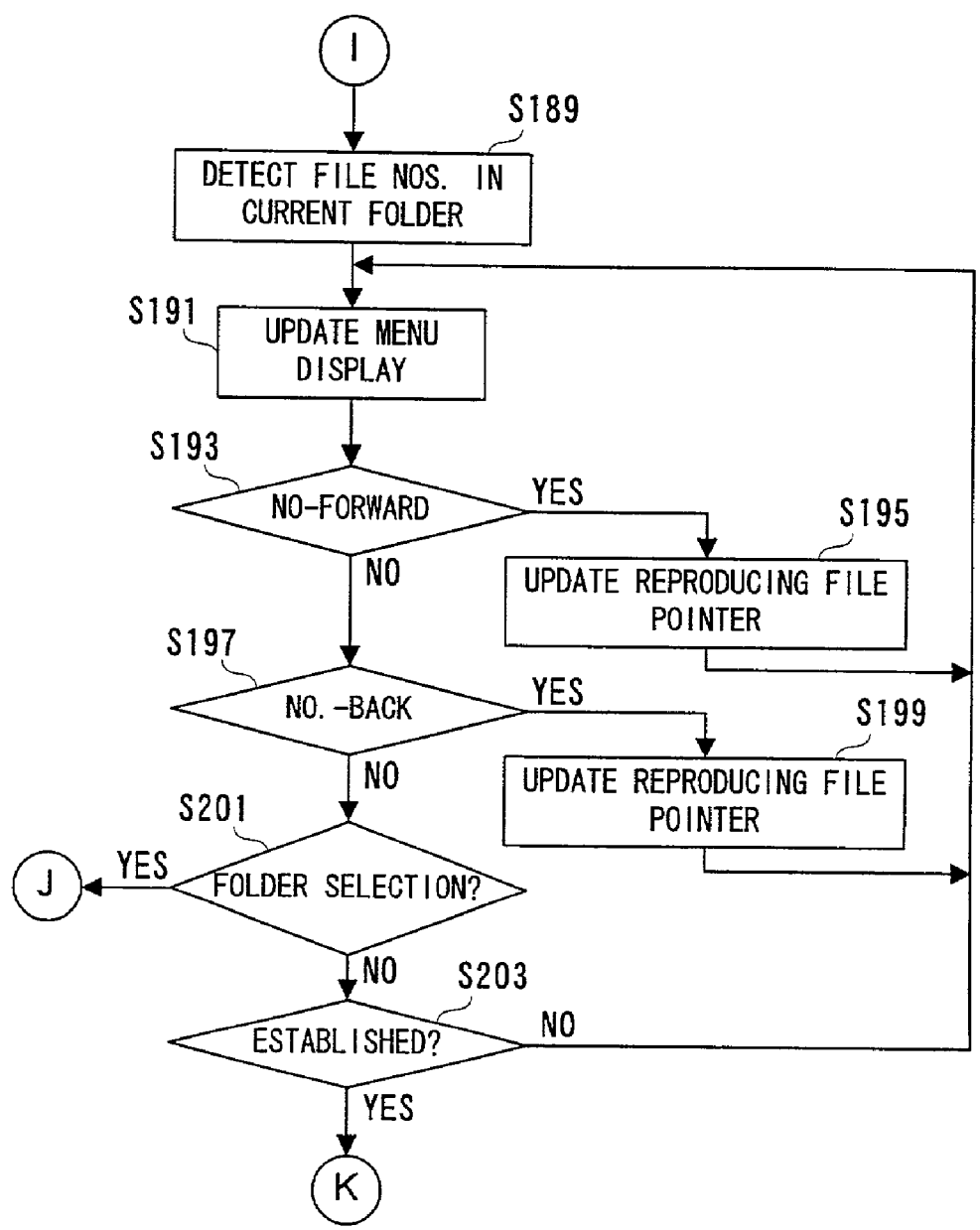
FIG. 10 is a flowchart showing another part of the processing of the FIG. 1 embodiment.

If the set key 50 is re-operated after the desired folder is selected as above, the CPU 32 determines YES in step S185, making the register 32e (reproducing file pointer) ineffective in step S187 and returns to the step S113 in FIG. 7. This means that as a result of updating the register 32c (reproducing folder pointer), the value of the register 32e (reproducing file pointer) is rendered insignificant and hence making the register 32e (reproducing file pointer) ineffective. As a consequence, in the step S139 as shown in FIG. 8 the image file included in the desired folder and having the maximum folder No. is reproduced.

Figure 21:
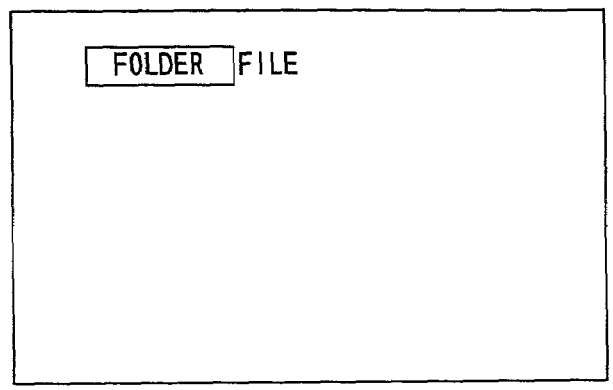
FIG. 21 is an illustrative view showing yet another part of the processing of the FIG. 1 embodiment.
Figure 22:
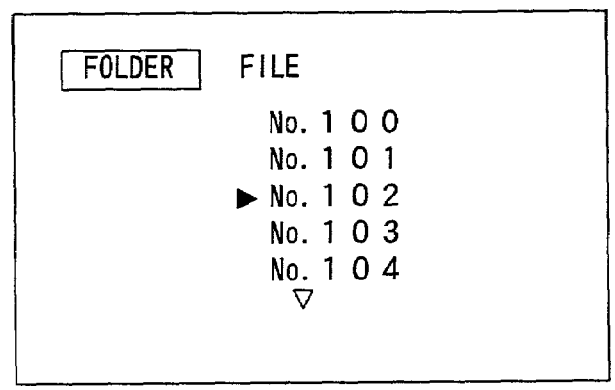
FIG. 22 is an illustrative view showing another part of the processing of the FIG. 1 embodiment.
Figure 24:
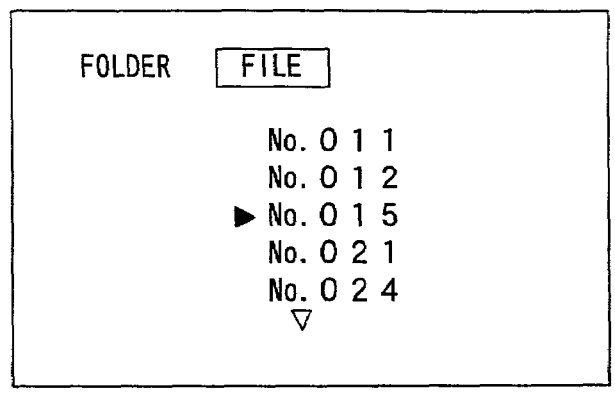
FIG. 24 is an illustrative view showing yet another part of the processing of the FIG. 1 embodiment.

While keeping the menu screen as shown in FIG. 21, when the operator selects the character of "FILE" in the upper of the monitor by the cursor key 48, the CPU 32 determines "YES" in step S169, and the process advances to step S189. If the file is selected while the menu screen is displayed as represented in FIG. 22 or FIG. 23, the process advances from step S183 to step S189. In the step S189 the file No. of the image file stored in the currently reproducing folder is detected, and in the succeeding step S191 the menu screen is updated as represented in FIG. 24. According to FIG. 24, at the center of the screen a plurality of the detected file Nos. is displayed, and the cursor points at the file No. represented by the register 32e (reproducing file pointer).

If the operator instructs the No.-forward by the cursor key 48 and set key 50, the CPU 32 advances from step S193 to step S195, and sets the file No. in close vicinity to and greater than the current reproducing file No. to the register 32e (reproducing file pointer). Upon completing the setting, the process returns to the step S191. Due to this, the cursor points at the updated file No. On the other hand, if the operator instructs the No.-back by the cursor key 48 and set key 50, the process advances from step S197 to step S199, and the file No. in close vicinity to and smaller than the current file No. is set to the register 32e (reproducing file pointer). Upon completing of the setting, the process returns to the step S191. As a result, a point destination of the cursor is changed to the updated file No.

If the set key 50 is pressed after the desired file No. is selected as explained above, the CPU 32 determines YES in step S203, and the process returns to the step S137. As a result, the image file having the desired file No. is reproduced. It is noted that if the folder is re-selected by the cursor key 48 and set key 50, in step S201 YES is determined, and the process returns to the step S171 shown in FIG. 9.

Figure 11:
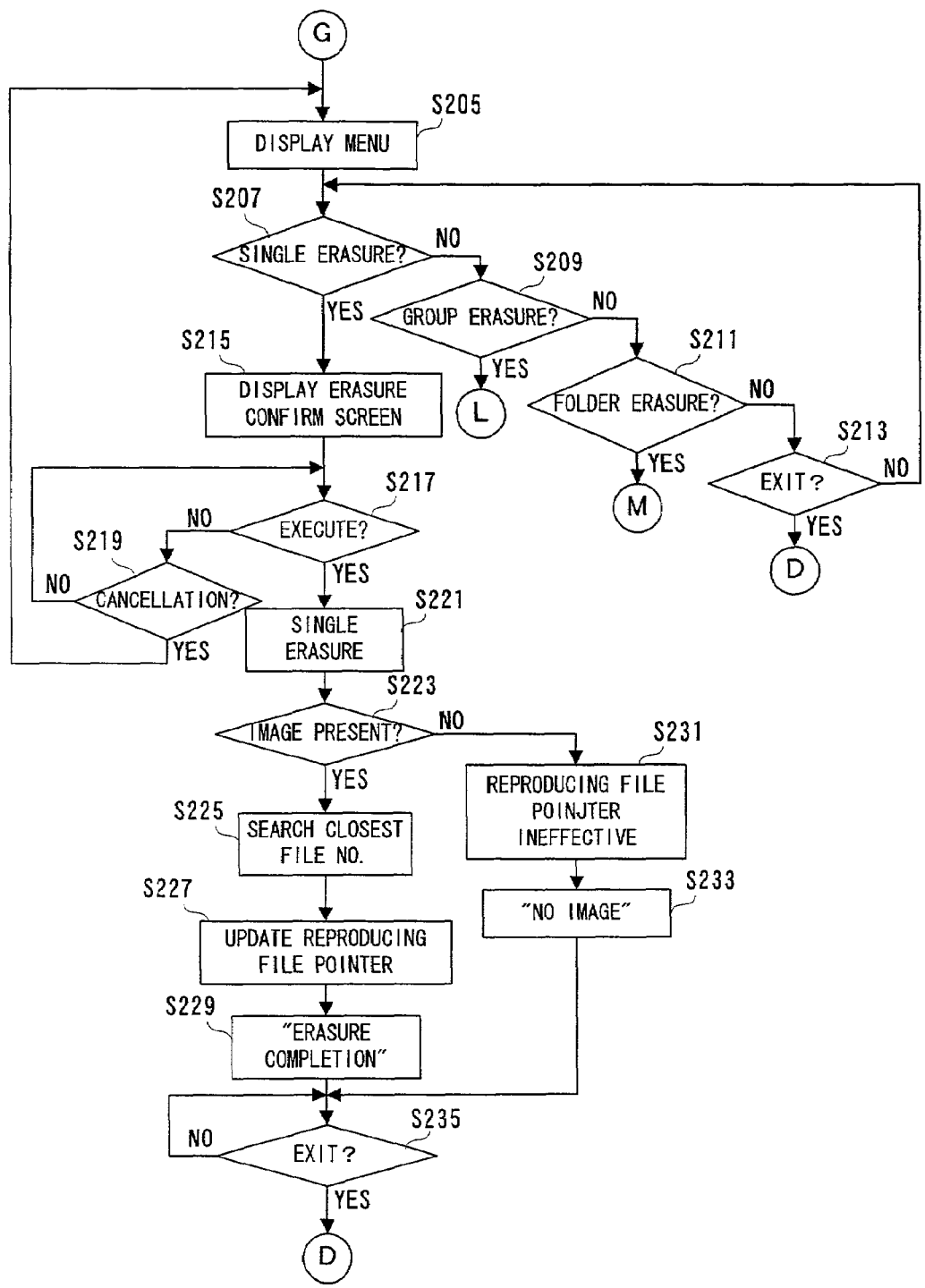
FIG. 11 is a flowchart showing still another part of the processing of the FIG. 1 embodiment.
Figure 25:
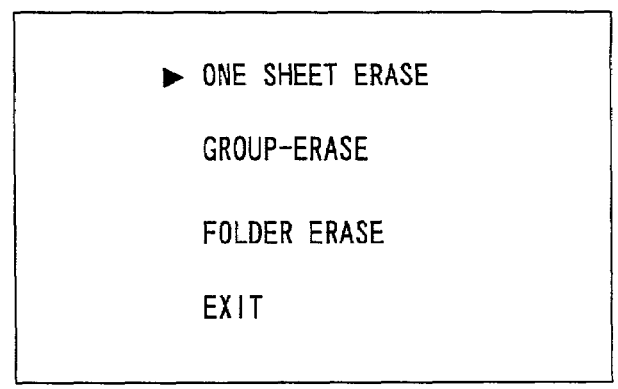
FIG. 25 is an illustrative view showing another part of the processing of the FIG. 1 embodiment.

When the operator selects the erase mode, the CPU 32 advances from the step S153 in FIG. 9 to step S205 in FIG. 11, and a menu screen as shown in FIG. 25 is displayed on the monitor 30. According to FIG. 25, the menu items of "ONE SHEET ERASE", "GROUP ERASE", "FOLDER ERASE" and "EXIT" and the cursor pointing at one of each menu item are displayed on the monitor 30.

Figure 26:
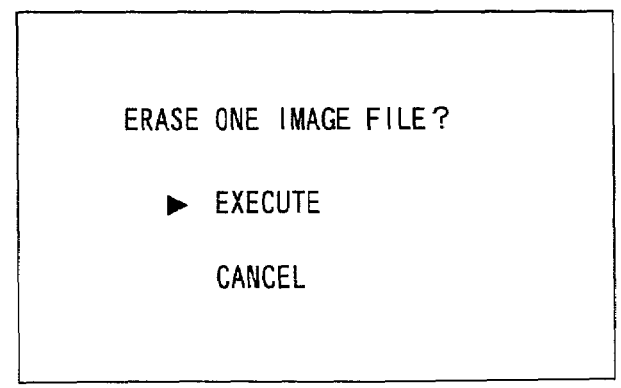
FIG. 26 is an illustrative view showing still another part of the processing of the FIG. 1 embodiment.

When the operator sets the cursor to "ONE SHEET ERASE" along with operating the set key 50, in step S215 an erase confirmation display represented in FIG. 26 is displayed on the monitor 30. According to FIG. 26, a question "ERASE IMAGE FILE?" and a menu item of "EXECUTE" and "CANCEL" are displayed. The cursor selects one of each menu item. If CANSEL is selected, the process returns to the step S205. If EXECUTE is selected, in step S221 the image file equivalent to one sheet is erased from the current folder. The image file to be erased is the image file assigned with the file No. shown by the register 32e (reproducing file pointer), namely this refers to the image file to be reproduced at this time.

Figure 27:
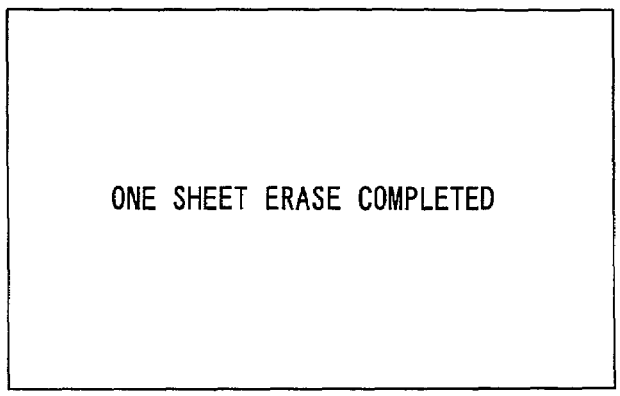
FIG. 27 is an illustrative view showing yet another part of the processing of the FIG. 1 embodiment.
Figure 28:
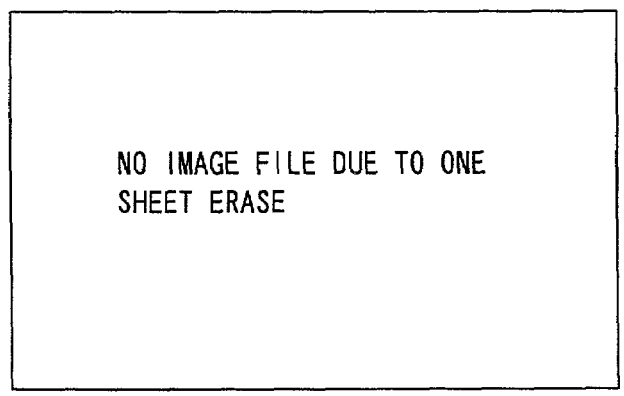
FIG. 28 is an illustrative view showing another part of the processing of the FIG. 1 embodiment.

Upon completing the one sheet erase, the CPU 32 determines in step S223 whether any image file remains in the current folder or not. If YES, the process advances to step S225, and searches for the file No. in close vicinity of the image file to be erased from the file Nos. remaining in the current folder. Next, the searched file No. is set to the register 32e (reproducing file pointer) in step S227, and a message display "ONE SHEET ERASE COMPLETED" represented in FIG. 27 is displayed on the monitor 30 in the step S229. On the other hand, if determined is NO in the step S223, the register 32e (reproducing file pointer) is made ineffective in step S231. In the step S211 as represented in FIG. 28, a message display "NO IMAGE FILE DUE TO ONE SHEET ERASE" is displayed on the monitor 30. Upon completing the step S229 or S233, determined in step S235 is whether or not the EXIT key 60 is operated, and the process returns to the step S131 represented in FIG. 8 corresponding to the key operation thereof.

Figure 12:
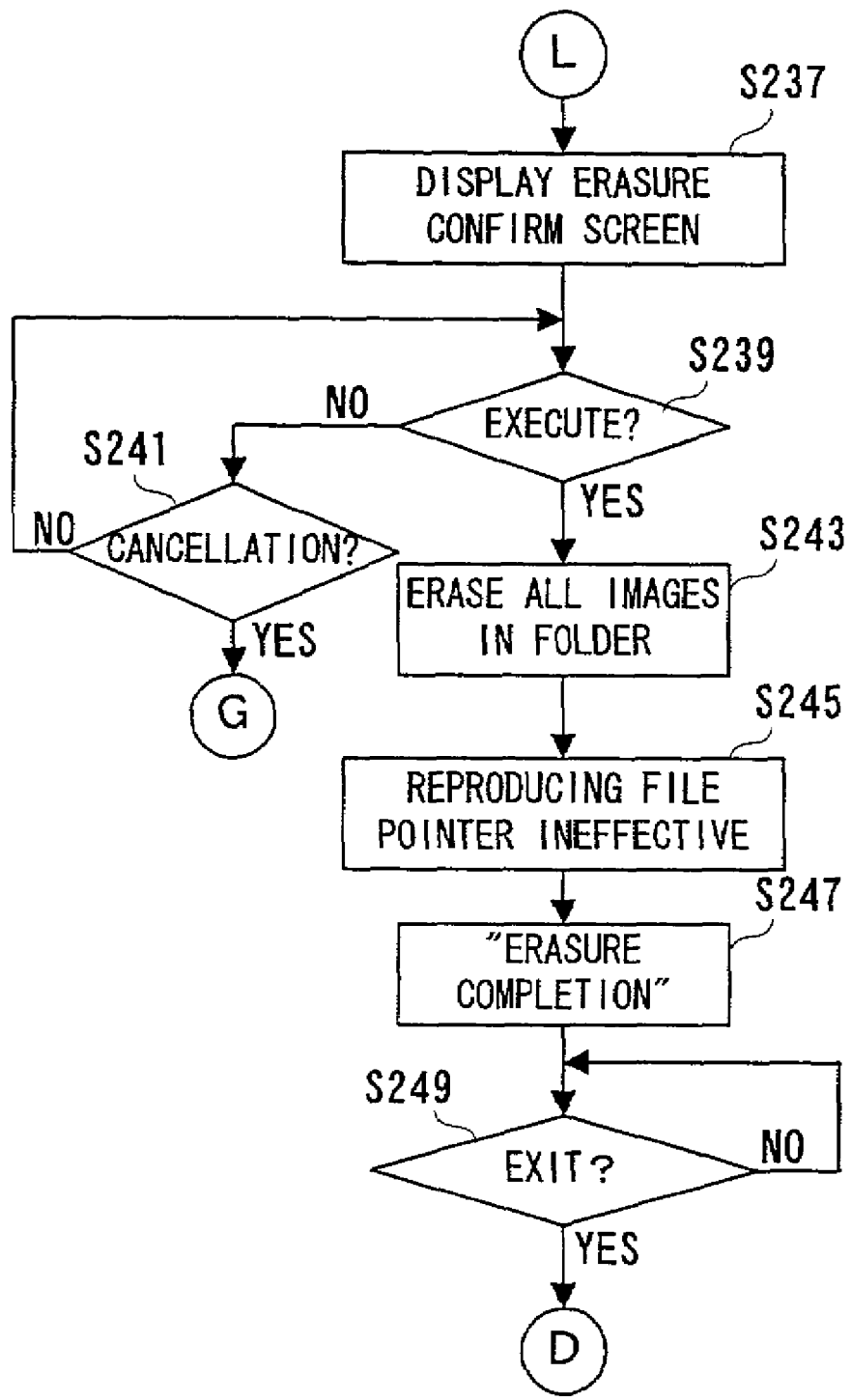
FIG. 12 is a flowchart showing yet another part of the processing of the FIG. 1 embodiment.
Figure 29:
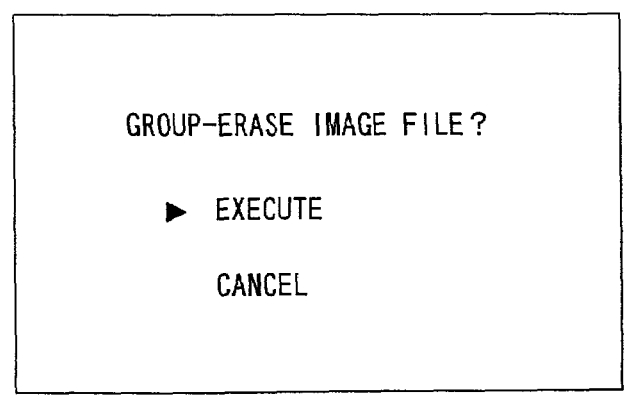
FIG. 29 is an illustrative view showing still another part of the processing of the FIG. 1 embodiment.
Figure 30:
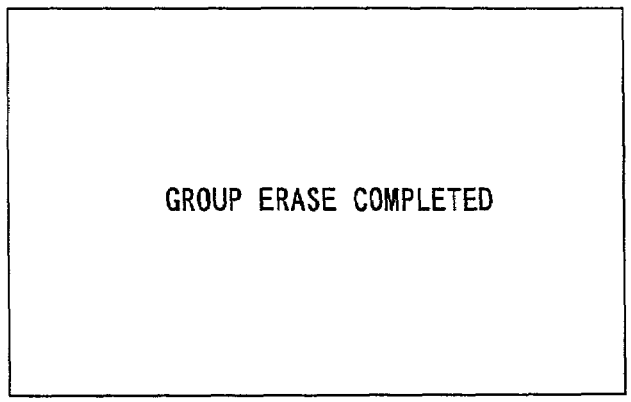
FIG. 30 is an illustrative view showing yet another part of the processing of the FIG. 1 embodiment.

With the menu screen shown in FIG. 25 being displayed, if the operator sets the cursor to the "GROUP ERASE" and presses the set key 50, the CPU 32 advances from step S209 in FIG. 11 to step S237 in FIG. 12. An erase confirmation screen shown in FIG. 29 is displayed. According to FIG. 29, a message "GROUP-ERASE IMAGE FILE?" and the menu item "EXECUTE" and "CANCEL" and the cursor pointing at one of each menu item are displayed on the monitor 30. If "CANCEL" is selected, the process returns to step S205, as a result, the display of the monitor 30 returns from FIG. 29 to FIG. 25. On the other hand, if "EXECUTE" is selected, in step S243 all image files included in the current folder are erased, and in step S245 the register 32e (reproducing file pointer) is made ineffective. Furthermore, a message display "GROUP ERASE COMPLETED" represented in FIG. 30 is displayed on the monitor 30 in step S247. Upon completing processing the message screen display, in step S249 determined is whether or not the EXIT key 60 is operated, and the process returns to the step S131 corresponding to the key operation thereof.

Figure 13:
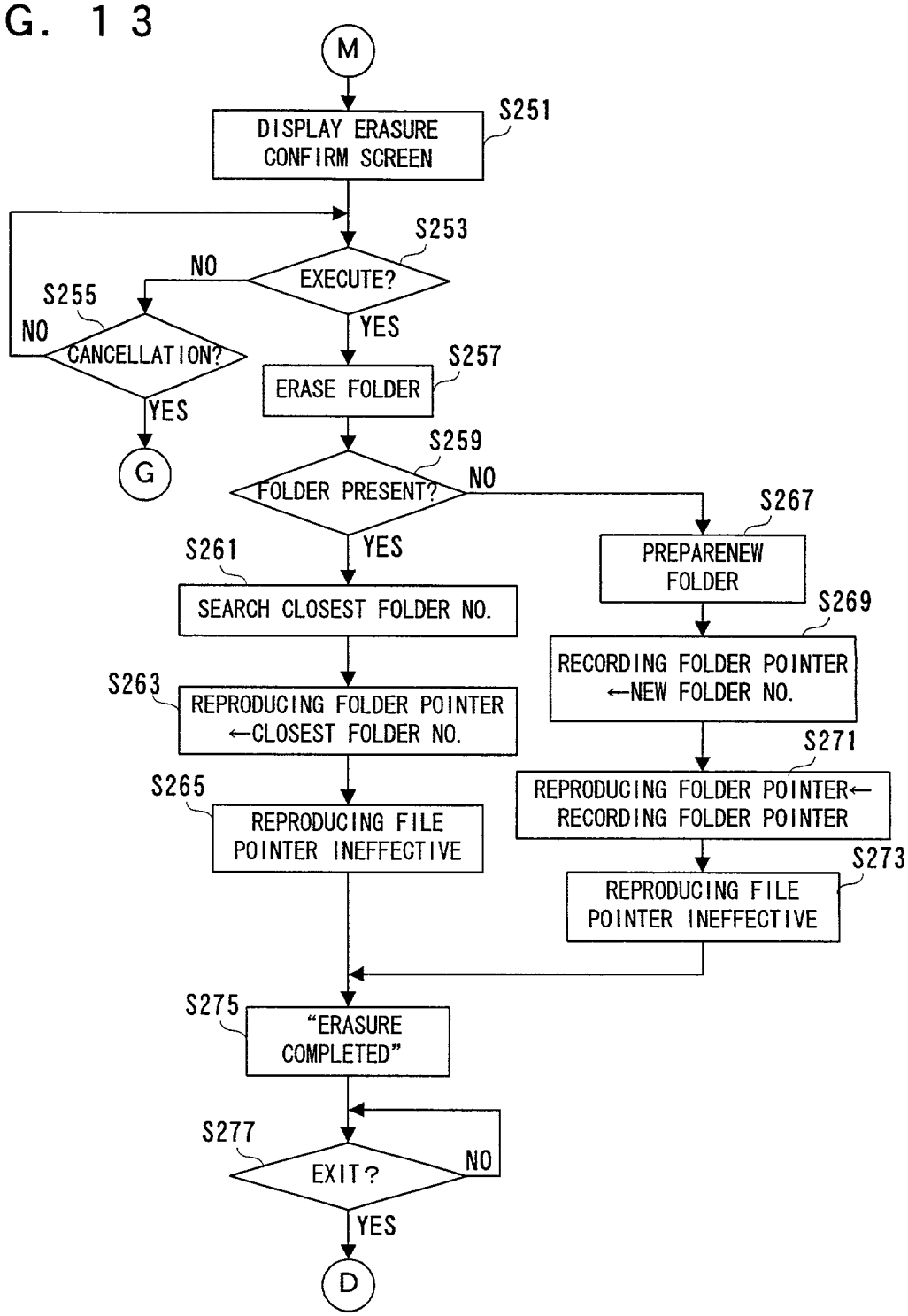
FIG. 13 is a flowchart showing another part of the processing of the FIG. 1 embodiment.
Figure 14:
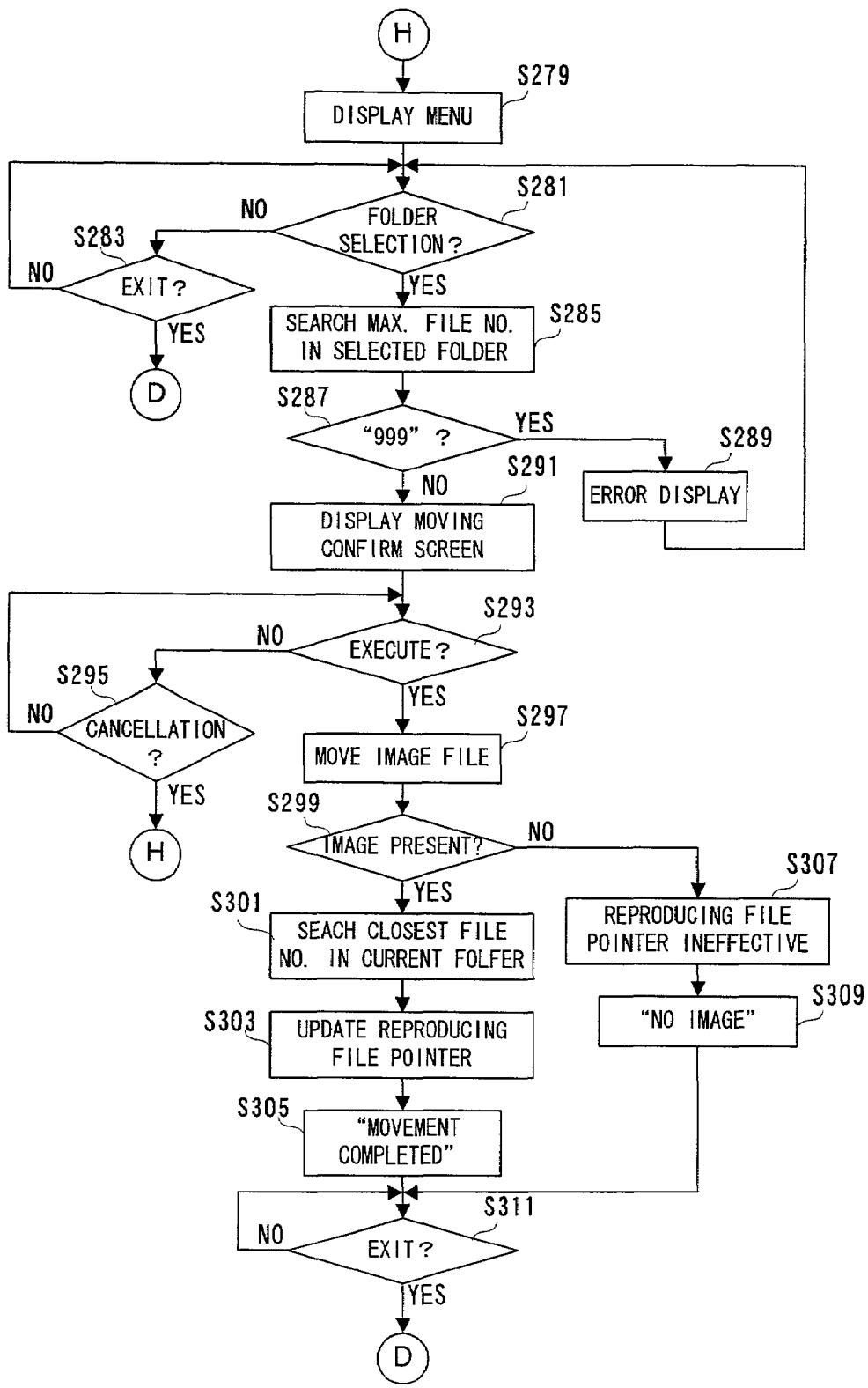
FIG. 14 is a flowchart showing still another part of the processing of the FIG. 1 embodiment.
Figure 31:
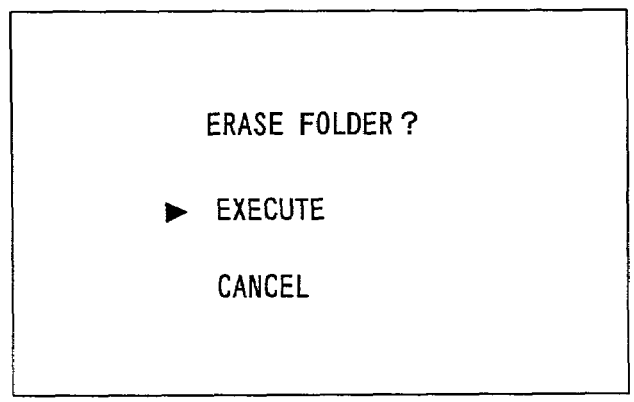
FIG. 31 is an illustrative view showing another part of the processing of the FIG. 1 embodiment.

Corresponding to the menu screen represented in FIG. 25, if the operator selects "FOLDER ERASE", the CPU 32 advances from the step S211 in FIG. 11 to step S251 in FIG. 13. The erase confirmation screen represented in FIG. 31 is displayed on the monitor 30. Namely, a message "ERASE FOLDER?", menu items as "EXECUTE","CANCEL" and the cursor pointing at one of each menu item are displayed on the monitor 30. If the operator selects "CANCEL", the process returns from step S255 to the step S205.

On the other hand, if the operator selects "EXECUTE", the process advances from step S253 to step S257 by erasing the current folder. In the succeeding step S259, determined is whether or not any file remains in the magnetooptical disk 40. If YES, together with searching for the folder No. in close vicinity to the erased file No. in step S261, the searched folder No. is set to the register 32c (reproducing folder pointer) in step S263. Furthermore, as the current folder No. is rendered insignificant by the erased folder and hence in step S265 the register 32e (reproducing file pointer) made ineffective. The process advances to step S275 thereafter.

When a folder is vanished from the magnetooptical disk 40 due to the folder erase, in the step S259 determined is No.

Subsequently, the CPU 32 newly prepares a folder assigned with a folder No. "000" in step S267, in step S269 a new folder No. "000" is set to the register 32b (recording folder pointer). Furthermore, in step S271 the folder No. of the register 32b (recording folder pointer) is set to the register 32c (reproducing folder pointer). Upon completing the process of step S273, in step S251 the register 32e (reproducing file pointer) is made insignificant, and then the process advances to the step S275.

Figure 32:
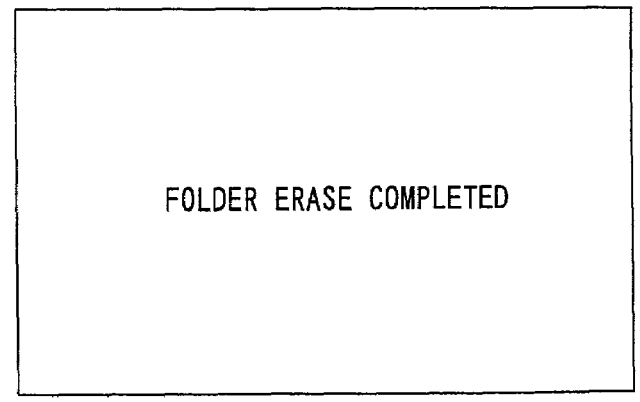
FIG. 32 is an illustrative view showing still another part of the processing of the FIG. 1 embodiment.

In the step S275 a message "FOLDER ERASED" as represented in FIG. 32 is displayed on the monitor 30. In the succeeding step S277 determined is whether or not the EXIT key 60 is operated. Then corresponding to the EXIT key 60, the process returns to the step S131 represented in FIG. 8.

Figure 33:
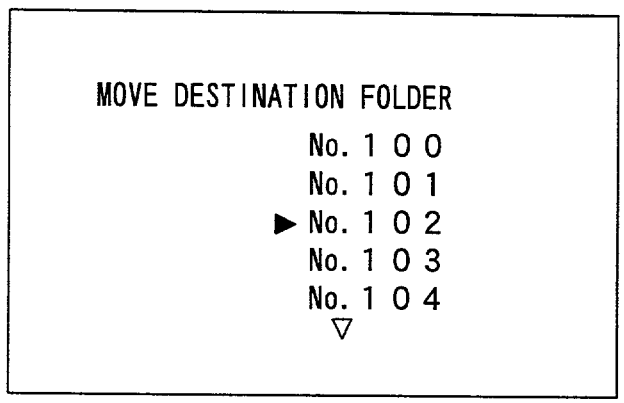
FIG. 33 is an illustrative view showing yet another part of the processing of the FIG. 1 embodiment.

It is noted that if the operator selects "EXIT" on the menu screen in FIG. 25, the CPU 32 returns from step S213 in FIG. 11 to the step S131 in FIG. 8. When the operator selects the file move mode, the CPU 32 advances from step S155 FIG. 8 to step S279 in FIG. 14, and the menu screen in FIG. 33 is displayed on the monitor 30. According to FIG. 33, a plurality of folder Nos. showing a destination folder and the cursor showing one of each folder Nos. are displayed on the monitor 30. While the process returns from step S283 to the step S131 in FIG. 8 when the EXIT key 60 is pressed, the process advances from step S281 to the step S285 when the desired No. is selected by the cursor key 48 and set key 50.

Figure 34:
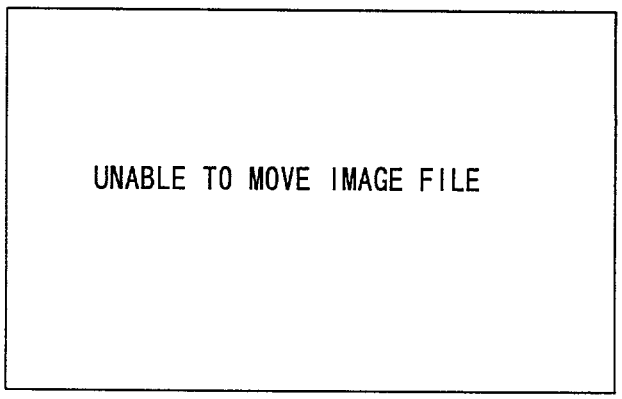
FIG. 34 is an illustrative view showing another part of the processing of the FIG. 1 embodiment.

In the step S285 the maximum folder No. is searched among a plurality of folder Nos. included in the selected folder. When the maximum folder No. is searched, in the succeeding step S287 determined is whether or not the maximum file No. is "999". As the number to be assigned to the image file is limited to "999", if determined YES in the step S287, a one second error display or the like is carried out in step S289. Concretely, a message "UNABLE TO MOVE IMAGE FILE" is displayed on the monitor 30 represented in FIG. 34. After a lapse of one second, the process returns to the step S281 and the menu screen shown in FIG. 33 is re-displayed on the monitor 30.

Figure 35:
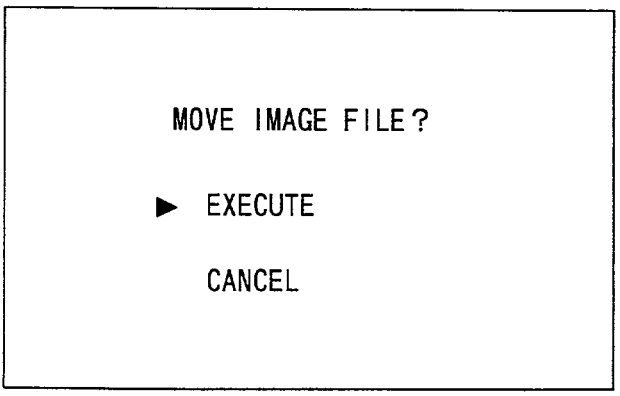
FIG. 35 is an illustrative view showing still another part of the processing of the FIG. 1 embodiment.

On the other hand, if the searched maximum file No. is less than "999", the process advances from the step S287 to step S291 and a move confirmation screen represented in FIG. 35 is displayed on the monitor 30. According to FIG. 35, a message "MOVE IMAGE FILE?", menu items as "EXECUTE" and "CANCEL" and the cursor pointing at one of each menu item are displayed on the monitor 30. If "CANCEL" is selected, the process returns from step S295 to the step S279. If "EXECUTE" is selected, the process advances from step S293 to step S297, and then an image file move process is carried out.

For example, by keeping a state where the image file of a file No. "003" included in the folder assigned with the folder No. "100" is being reproduced, and then if the file folder "103" is selected as a move folder, the file No. "003" image file is moved to the folder No. "103" folder. It is noted that in order to avoid a number duplication in the moved folder, the file No. of the moved image file is updated by adding "One" to the maximum file No.

Figure 36:
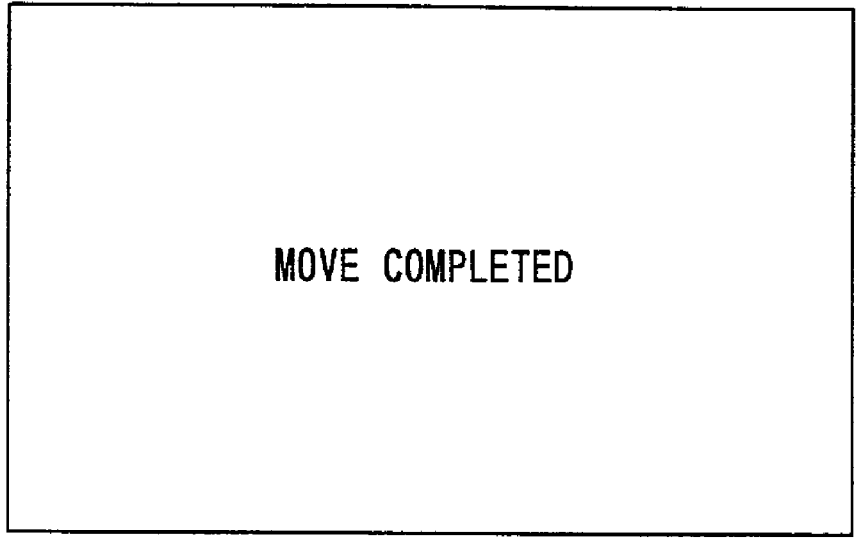
FIG. 36 is an illustrative view showing yet another part of the processing of the FIG. 1 embodiment.

Upon completing the move process, the process advances to step S299, and determined is whether or not the image file remains in the current folder. If the image file remains, the process advances to step S301, and searches for a file No. in close vicinity of the moved image file from the file Nos. remaining in the current folder. Then, the searched file No. is set to the register 32e (reproducing file pointer) in step S303. Upon completing the setting, a message "MOVE COMPLETED" represented in the step S305 in FIG. 36 is displayed on the monitor 30.

Figure 37:
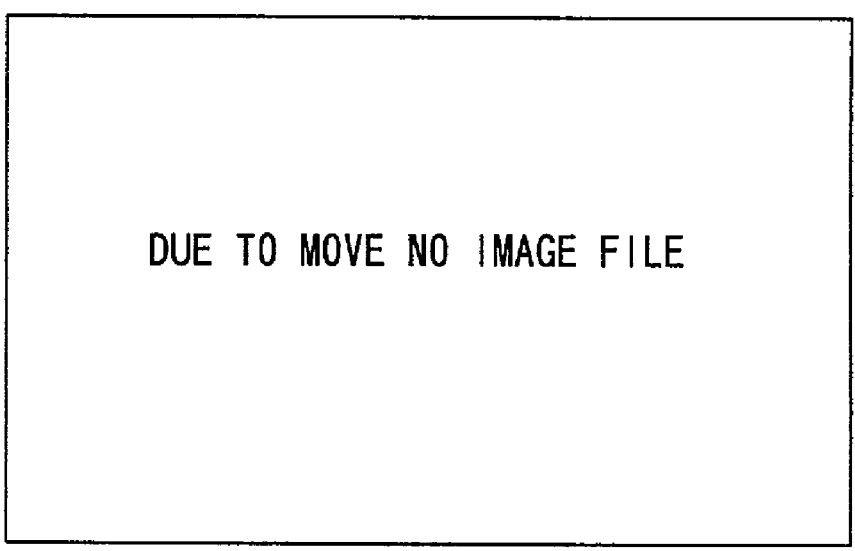
FIG. 37 is an illustrative view showing another part of the processing of the FIG. 1 embodiment.

On the other hand, if no image file remains in the current folder, in the step S299 determined is NO. Together with making the register 32e (reproducing file pointer) insignificant in step S307, a message "DUE TO MOVE NO IMAGE FILE" represented in FIG. 37 is displayed on the monitor 30 in step S309. Upon completing processes of step S305 and step S309, in step S311 determined is whether or not the EXIT key 60 is operated, and corresponding to the key operation, the process returns to the step S131 in FIG. 8.

According to this embodiment, a plurality of folders are formed in the magnetooptical disk. The folders manage a plurality of image files. If the magnetooptical disk is received in the slot, and if the information search mode is selected, the folder Nos. of the plurality of folders formed in the magnetooptical disk are detected by the CPU. The detected folder Nos. are displayed on the monitor screen by the CPU and the character generator.

If any one of the folder Nos. displayed on the monitor is selected by the cursor key and the set key, the number of image files managed by the folder holding the selected folder No. is detected by the CPU. The detected number of files is displayed on the monitor screen by the CPU and the character generator. In other words, the number of files and the plurality of folder Nos. are displayed on the same screen. The CPU also detects a total number of the image files, and the detected total number is displayed on the monitor screen by the CPU and the character generator. In other words, the total number and the plurality of folder Nos. are also displayed on the same screen.

For this reason, it can be easily understood that how many image files are stored in each folders and what is a total number of image files recorded in the magnetooptical disk.

Incidentally, in this embodiment, each time the shutter key is manipulated, one sheet of still image file is newly prepared. However, by providing a sequential shot mode or video clip mode, a plurality of still image files may be prepared in response to one picture-taking instruction in the sequential shot mode. A moving image file may be provided responsive to one picture-taking instruction in the video clip mode. Furthermore, utilizing a microphone, a sound file may be prepared.

Incidentally, although a CCD imager is used as an image sensor in this embodiment, a CMOS imager may be used instead of a CCD imager. Furthermore, although a magnetooptical disk is utilized as a recording medium in this embodiment, a non-volatile semiconductor memory or hard disk drive may be used instead of a magnetooptical disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reproducing apparatus comprising:
    an attacher to be attached with a recording medium in which a plurality of folders for managing a plurality of image files are formed;
    a folder number detector for detecting folder identification numbers which respectively represent the folders formed in said recording medium;
    a folder number displayer for displaying on a screen the folder identification numbers detected by said folder number detector;
    a selector for accepting a selecting operation to select any one of the folder identification numbers displayed by said folder number displayer in parallel with a display process of said folder number displayer;
    a file number detector for detecting only a count value obtained by counting the number of image files managed by a folder holding the folder identification number selected by the selecting operation out of count values obtained by counting for each folder the number of image files managed by the folders formed in said recording medium;
    a total file number detector for detecting a total number of the image files recorded in said recording medium;
    a file number displayer for displaying the count value detected by said file number detector and the total number of image files detected by said total file number detector on the screen on which the folder identification numbers are displayed by said folder number displayer; and
    an information search mode selector to set an information search mode,
    wherein folder identification numbers, the total number of image files recorded in the recording medium and a count value of the number of image files managed by a currently selected folder are detected and concurrently displayed in response to setting of the information search mode.

2. An image reproducing apparatus according to claim 1, wherein said selector is able to select another folder identification number after a display process of said file number displayer.

3. An image reproducing apparatus according to claim 1, further comprising a folder creator for creating a new folder in said recording medium when a folder creating operation is carried out.

4. An image reproducing apparatus according to claim 1, further comprising a folder creator for creating a new folder in said recording medium when a writing of an image file to a designated folder is instructed in a state that the number of files managed by the designated folder indicates a predetermined value.

5. An image reproducing apparatus according to claim 1, further comprising a file mover for moving an image file from a folder to another folder when a file moving operation is carried out, wherein said another folder is arbitrarily selectable from among the plurality of folders formed in said recording medium.

6. An image reproducing apparatus, comprising:
    a reproducer for reproducing a designated image file out of a plurality of image files which are managed by a plurality of folders formed in a recording medium when a reproduction mode is selected;
    a first detector for detecting folder identification numbers which respectively identify the folders formed in said recording medium when an information search mode is selected;
    a second detector for detecting a total number of the image files recorded in said recording medium in relation to a detecting process of said first detector;
    a third detector for detecting only a count value obtained by counting the number of image files managed by a folder corresponding to a designated folder identification number out of count values obtained by counting for each folder the number of image files managed by the folders formed in said recording medium;

a displayer for concurrently displaying on a screen the folder identification numbers, the total number and the count value which are respectively detected by said first detector, said second detector and said third detector;

an acceptor for accepting a number renewing operation in parallel with a display process of said displayer; and a renewer for renewing the designated folder identification number noted by said third detector in response to the renewing operation accepted by said acceptor.

7. An image reproducing apparatus according to claim 6, wherein the information search mode is a mode independent from the reproduction mode.

8. An image reproducing apparatus according to claim 6, wherein said displayer displays the count value at a position corresponding to the designated folder identification number.

9. An image reproducing apparatus according to claim 6, further comprising a folder creator for creating a new folder in said recording medium in response to a folder creating operation in a state of a specific mode being selected.

10. An image reproducing apparatus according to claim 6, further comprising:

a determiner for determining whether or not the number of image files managed by the designated folder indicates a predetermined value when a writing mode is selected;

a folder creator for creating a new folder in said recording medium when a determination result of said determiner is affirmative; and a designator for alternately designating the new folder created by said folder creator as a writing destination.

11. An image reproducing apparatus according to claim 6, further comprising a file mover for moving an image file from a folder to another folder in response to a file moving operation in a state of the reproduction mode being selected, wherein said another folder is arbitrarily selectable from among the folders formed in said recording medium.

\* \* \* \* \*